(12) United States Patent
Heath et al.

(10) Patent No.: US 11,738,398 B2
(45) Date of Patent: Aug. 29, 2023

(54) ACCESSORY FOR AN OSCILLATING POWER TOOL

(71) Applicant: MILWAUKEE ELECTRIC TOOL CORPORATION, Brookfield, WI (US)

(72) Inventors: Peter R. Heath, Wauwatosa, WI (US); Courtney J. Burns, Wauwatosa, WI (US); Jonathan E. Abbott, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/767,467

(22) PCT Filed: Nov. 9, 2021

(86) PCT No.: PCT/US2021/058579
§ 371 (c)(1),
(2) Date: Apr. 8, 2022

(87) PCT Pub. No.: WO2022/108785
PCT Pub. Date: May 27, 2022

(65) Prior Publication Data
US 2022/0371113 A1 Nov. 24, 2022

Related U.S. Application Data

(60) Provisional application No. 63/115,214, filed on Nov. 18, 2020.

(51) Int. Cl.
*B23D 51/10* (2006.01)
*B27B 19/00* (2006.01)

(52) U.S. Cl.
CPC ............ *B23D 51/10* (2013.01); *B27B 19/006* (2013.01)

(58) Field of Classification Search
USPC ....................................................... D8/20, 70
See application file for complete search history.

(56) References Cited

U.S. PATENT DOCUMENTS

| 3,554,197 A | 1/1971 | Dobbie |
| 3,905,374 A | 9/1975 | Winter |

(Continued)

FOREIGN PATENT DOCUMENTS

| AU | 2011201633 A1 | 11/2011 |
| AU | 2013205490 A1 | 5/2013 |

(Continued)

OTHER PUBLICATIONS

Omega Surgical Instruments Inc, Catalogue, 2010, 128 pages.

(Continued)

*Primary Examiner* — Hwei-Siu C Payer
(74) *Attorney, Agent, or Firm* — Michael Best & Friedrich LLP

(57) ABSTRACT

An accessory for an oscillating power tool includes an anchor for selectively coupling with an oscillating power tool. The anchor includes a generally planar portion having an anchor interface configured to couple to the oscillating power tool and defining a longitudinal axis and a center point. The anchor interface includes a central aperture and a plurality of peripheral openings. The central aperture includes the center point therein. The plurality of peripheral openings are disposed radially about the center point and in communication with the central aperture. The plurality of peripheral openings also includes at least one conjoined group of peripheral openings collectively in communication with the central aperture by way of a shared neck opening. The at least one conjoined group includes a first peripheral opening, a second peripheral opening, and a third peripheral opening.

20 Claims, 8 Drawing Sheets

(56) References Cited

U.S. PATENT DOCUMENTS

| | | |
|---|---|---|
| 3,943,934 A | 3/1976 | Bent |
| 4,106,181 A | 8/1978 | Mattchen |
| 4,386,609 A | 6/1983 | Mongeon |
| 4,461,296 A | 7/1984 | Hodge |
| 4,513,742 A | 4/1985 | Arnegger |
| 4,584,999 A | 4/1986 | Arnegger |
| 4,617,930 A | 10/1986 | Saunders |
| 4,637,170 A | 1/1987 | Block |
| 4,637,391 A | 1/1987 | Schlein |
| 4,872,452 A | 10/1989 | Alexson |
| 4,920,702 A | 5/1990 | Kloss et al. |
| 4,980,976 A | 1/1991 | Junginger et al. |
| 5,002,555 A | 3/1991 | Petersen |
| 5,038,478 A | 8/1991 | Mezger et al. |
| 5,122,142 A | 6/1992 | Pascaloff |
| 5,178,626 A | 1/1993 | Pappas |
| D337,160 S | 7/1993 | Evans |
| 5,263,972 A | 11/1993 | Evans et al. |
| 5,265,343 A | 11/1993 | Pascaloff |
| D343,247 S | 1/1994 | Walen |
| 5,303,688 A | 4/1994 | Chiuminatta et al. |
| 5,306,285 A | 4/1994 | Miller et al. |
| D351,907 S | 10/1994 | Matthai et al. |
| 5,366,312 A | 11/1994 | Raines |
| 5,382,249 A | 1/1995 | Fletcher |
| 5,423,845 A | 6/1995 | McDaniel |
| D362,065 S | 9/1995 | Goris |
| 5,477,845 A | 12/1995 | Zuzelo |
| 5,489,285 A | 2/1996 | Goris |
| 5,496,316 A | 3/1996 | Goris |
| 5,507,763 A | 4/1996 | Petersen et al. |
| 5,584,753 A | 12/1996 | Takahashi |
| 5,694,643 A | 12/1997 | Fujiwara |
| 5,694,693 A | 12/1997 | Hutchins et al. |
| 5,735,866 A | 4/1998 | Adams |
| D394,315 S | 5/1998 | Fisher |
| D406,223 S | 3/1999 | Tran |
| D424,076 S | 5/2000 | Dibbern et al. |
| 6,113,618 A | 9/2000 | Nic |
| 6,116,996 A | 9/2000 | Yanase |
| D459,805 S | 7/2002 | Pascaloff |
| D467,485 S | 12/2002 | Daniels et al. |
| D489,823 S | 5/2004 | Fisher et al. |
| 6,743,086 B2 | 6/2004 | Nelson et al. |
| 6,796,888 B2 | 9/2004 | Jasch |
| 6,802,764 B2 | 10/2004 | Besch |
| 6,865,813 B2 | 3/2005 | Pollak |
| 6,929,538 B2 | 8/2005 | Yi |
| 6,945,862 B2 | 9/2005 | Jasch et al. |
| 7,189,239 B2 | 3/2007 | Fisher et al. |
| 7,217,177 B2 | 5/2007 | Freeh et al. |
| 7,695,352 B2 | 4/2010 | Schumacher |
| D619,152 S | 7/2010 | Evatt et al. |
| 7,901,424 B2 | 3/2011 | Fletcher et al. |
| D651,062 S | 12/2011 | Wackwitz |
| D651,499 S | 1/2012 | Tong |
| 8,151,679 B2 | 4/2012 | Bohne |
| D682,652 S | 5/2013 | McRoberts et al. |
| 8,499,674 B2 | 8/2013 | Holba et al. |
| D693,193 S | 11/2013 | Bozic |
| D694,076 S | 11/2013 | Davidian et al. |
| D694,596 S | 12/2013 | Davidian et al. |
| D694,597 S | 12/2013 | Davidian et al. |
| D694,598 S | 12/2013 | Davidian et al. |
| D694,599 S | 12/2013 | Davidian et al. |
| 8,616,562 B2 | 12/2013 | Maras |
| D697,384 S | 1/2014 | Wackwitz |
| D706,595 S | 6/2014 | Kaye, Jr. et al. |
| 8,852,221 B2 | 10/2014 | Boykin et al. |
| 8,915,499 B2 | 12/2014 | Kaye, Jr. et al. |
| 8,920,424 B2 | 12/2014 | Boykin |
| 8,925,931 B2 | 1/2015 | Sergyeyenko et al. |
| 8,950,756 B2 | 2/2015 | Lu et al. |
| D724,923 S | 3/2015 | McRoberts et al. |
| 9,067,293 B2 | 6/2015 | Bernardi et al. |
| 9,073,195 B2 | 7/2015 | Kaye, Jr. et al. |
| D741,135 S | 10/2015 | Yang et al. |
| D741,136 S | 10/2015 | Yang et al. |
| D741,137 S | 10/2015 | Yang et al. |
| 9,186,770 B2 | 11/2015 | Montplaisir et al. |
| 9,242,361 B2 | 1/2016 | Kaye, Jr. et al. |
| D750,461 S | 3/2016 | McRoberts et al. |
| 9,414,845 B2 | 8/2016 | Boykin |
| 9,539,647 B2 | 1/2017 | Sergyeyenko |
| 9,737,969 B2 | 8/2017 | Bek et al. |
| 9,815,187 B2 | 11/2017 | Kozak |
| D817,127 S | 5/2018 | Gopi |
| D817,128 S * | 5/2018 | Gopi ............................... D8/20 |
| 10,016,904 B2 | 7/2018 | Jones |
| 10,040,186 B2 | 8/2018 | Kaye, Jr. et al. |
| 10,076,832 B2 | 9/2018 | Nagy |
| D832,666 S | 11/2018 | Kaye, Jr. et al. |
| 10,124,461 B2 | 11/2018 | Kuehne et al. |
| 10,207,385 B2 | 2/2019 | Montplaisir et al. |
| 10,245,716 B2 | 4/2019 | Kaye, Jr. et al. |
| 10,245,744 B2 | 4/2019 | Morcos |
| 10,265,778 B2 | 4/2019 | Kaye, Jr. et al. |
| 10,307,917 B2 | 6/2019 | Marks |
| D853,817 S | 7/2019 | Ji |
| D856,766 S | 8/2019 | Kaye, Jr. et al. |
| D862,185 S | 10/2019 | Dai |
| 10,427,230 B2 | 10/2019 | Bernardi et al. |
| D871,185 S | 12/2019 | Kaye, Jr. et al. |
| D873,099 S | 1/2020 | Kaye, Jr. et al. |
| D884,444 S | 5/2020 | Kaye, Jr. et al. |
| 11,235,452 B2 | 2/2022 | Kaye, Jr. et al. |
| 2003/0176225 A1 | 9/2003 | Besch et al. |
| 2004/0098000 A1 | 5/2004 | Kleinwaechter |
| 2004/0138668 A1 | 7/2004 | Fisher et al. |
| 2005/0153640 A1 | 7/2005 | Stein et al. |
| 2006/0123959 A1 | 6/2006 | Bocast |
| 2006/0288837 A1 | 12/2006 | Utz et al. |
| 2009/0022562 A1 | 1/2009 | Chin |
| 2009/0312762 A1 | 12/2009 | Boykin |
| 2010/0052269 A1 | 3/2010 | Zaiser et al. |
| 2010/0056029 A1 | 3/2010 | Grunikiewicz |
| 2011/0227300 A1 | 9/2011 | Zhang et al. |
| 2011/0266758 A1 | 11/2011 | Sergyeyenko et al. |
| 2011/0266759 A1 | 11/2011 | Goldman |
| 2011/0291368 A1 | 12/2011 | Chen et al. |
| 2011/0309589 A1 | 12/2011 | Maras |
| 2011/0316241 A1 | 12/2011 | Zhang et al. |
| 2011/0316242 A1 | 12/2011 | Zhang et al. |
| 2012/0066919 A1 | 3/2012 | Holba et al. |
| 2012/0169018 A1 | 7/2012 | Lu et al. |
| 2012/0170976 A1 | 7/2012 | Cai |
| 2012/0211951 A1 | 8/2012 | Montplaisir et al. |
| 2013/0082449 A1 | 4/2013 | Bernardi et al. |
| 2013/0193655 A1 | 8/2013 | Kaye, Jr. et al. |
| 2013/0341876 A1 | 12/2013 | Sergyeyenko |
| 2014/0015207 A1 | 1/2014 | Kaye, Jr. et al. |
| 2014/0017000 A1 | 1/2014 | Kaye, Jr. et al. |
| 2014/0035242 A1 | 2/2014 | Kaye, Jr. et al. |
| 2014/0071746 A1 | 3/2014 | Jurasek et al. |
| 2014/0252729 A1 | 9/2014 | Xu |
| 2014/0299345 A1 | 10/2014 | McRoberts et al. |
| 2014/0325855 A1 | 11/2014 | Bozic |
| 2015/0112347 A1 | 4/2015 | Boykin |
| 2016/0096261 A1 | 4/2016 | Kaye, Jr. et al. |
| 2016/0257010 A1 | 9/2016 | Jones |
| 2016/0354945 A1 | 12/2016 | Morcos |
| 2017/0028525 A1 | 2/2017 | Bek et al. |
| 2017/0057050 A1 | 3/2017 | Montplaisir et al. |
| 2017/0173754 A1 | 6/2017 | Kuehne et al. |
| 2017/0291238 A1 | 10/2017 | Bernardi et al. |
| 2018/0029190 A1 | 2/2018 | Nagy |
| 2018/0125503 A1 | 5/2018 | Sidebotham et al. |
| 2018/0200812 A1 | 7/2018 | Kaye, Jr. et al. |
| 2018/0333834 A1 | 11/2018 | Kaye, Jr. et al. |
| 2019/0054552 A1 | 2/2019 | Churchill |
| 2019/0168372 A1 * | 6/2019 | Aoki ..................... B25F 5/02 |
| 2019/0176315 A1 | 6/2019 | Kaye, Jr. et al. |
| 2019/0247933 A1 | 8/2019 | Castro Pena |

(56) References Cited

U.S. PATENT DOCUMENTS

| | | | |
|---|---|---|---|
| 2019/0247969 A1 | 8/2019 | Rubens et al. | |
| 2021/0114125 A1* | 4/2021 | Heath | B23D 61/006 |
| 2022/0371113 A1* | 11/2022 | Heath | B23D 61/123 |

FOREIGN PATENT DOCUMENTS

| | | |
|---|---|---|
| AU | 2013205501 A1 | 5/2013 |
| AU | 2013100855 A4 | 7/2013 |
| AU | 2014280901 A1 | 1/2015 |
| CA | 2727400 A1 | 12/2009 |
| CA | 2736992 A1 | 10/2011 |
| CA | 2850613 A1 | 4/2013 |
| CA | 2810464 A1 | 5/2013 |
| CN | 201483468 U | 5/2010 |
| CN | 301370135 S | 10/2010 |
| CN | 301397046 S | 12/2010 |
| CN | 201691995 U | 1/2011 |
| CN | 201711949 U | 1/2011 |
| CN | 201728642 U | 2/2011 |
| CN | 201907110 U | 7/2011 |
| CN | 202045628 U | 11/2011 |
| CN | 301713160 S | 11/2011 |
| CN | 202129785 U | 2/2012 |
| CN | 202241199 U | 5/2012 |
| CN | 301952335 S | 6/2012 |
| CN | 202318259 U | 7/2012 |
| CN | 301991362 S | 7/2012 |
| CN | 102689292 A | 9/2012 |
| CN | 202592349 U | 12/2012 |
| CN | 202622741 U | 12/2012 |
| CN | 202668513 U | 1/2013 |
| CN | 102975178 A | 3/2013 |
| CN | 103101037 A | 5/2013 |
| CN | 103101038 A | 5/2013 |
| CN | 103121206 A | 5/2013 |
| CN | 203185304 U | 9/2013 |
| CN | 103370169 A | 10/2013 |
| CN | 302714085 S | 1/2014 |
| CN | 302714086 S | 1/2014 |
| CN | 102098970 B | 3/2014 |
| CN | 203726448 U | 7/2014 |
| CN | 104136168 A | 11/2014 |
| CN | 104191419 A | 12/2014 |
| CN | 204209649 U | 3/2015 |
| CN | 204431209 U | 7/2015 |
| CN | 104985571 A | 10/2015 |
| CN | 105215949 A | 1/2016 |
| CN | 105234903 A | 1/2016 |
| CN | 105235903 A | 1/2016 |
| CN | 105235904 A | 1/2016 |
| CN | 105382776 A | 3/2016 |
| CN | 105538240 A | 5/2016 |
| CN | 205215195 U | 5/2016 |
| CN | 205218195 U | 5/2016 |
| CN | 205219042 U | 5/2016 |
| CN | 105904414 A | 8/2016 |
| CN | 205685281 U | 11/2016 |
| CN | 304282930 S | 9/2017 |
| CN | 304741038 S | 7/2018 |
| CN | 209850839 U | 12/2019 |
| DE | 3833735 A1 | 4/1989 |
| DE | 4425456 A1 | 3/1996 |
| DE | 4444496 A1 | 6/1996 |
| DE | 20012138 U1 | 12/2000 |
| DE | 20100311 U1 | 5/2001 |
| DE | 1010063001 | 6/2002 |
| DE | 20303018 U1 | 4/2003 |
| DE | 10307840 B3 | 6/2004 |
| DE | 202004007929 U1 | 7/2004 |
| DE | 202007003589 U1 | 7/2007 |
| DE | 102007036786 A1 | 10/2008 |
| DE | 202011052299 U1 | 2/2012 |
| DE | 102012201624 A1 | 8/2013 |
| DE | 102012203754 A1 | 9/2013 |
| DE | 202014102532 U1 | 6/2014 |
| DE | 102015119962 A1 | 6/2016 |
| DE | 202016102955 U1 | 6/2016 |
| DE | 102015114028 A1 | 3/2017 |
| EP | 0695607 A1 | 2/1996 |
| EP | 1607058 A1 | 12/2005 |
| EP | 2382929 A1 | 11/2011 |
| EP | 2497616 A1 | 9/2012 |
| EP | 2623262 A2 | 8/2013 |
| EP | 2687336 A2 | 1/2014 |
| EP | 2695706 A2 | 2/2014 |
| EP | 3023185 A2 | 5/2016 |
| EP | 3135439 A1 | 3/2017 |
| EP | 3348367 A1 | 7/2018 |
| FR | 2968589 A3 | 6/2012 |
| GB | 2520580 A | 5/2015 |
| JP | 2011523883 A | 12/2014 |
| WO | WO2009151958 A2 | 12/2009 |
| WO | WO2011000322 A1 | 1/2011 |
| WO | WO2012016365 A1 | 2/2012 |
| WO | WO2012075967 A1 | 6/2012 |
| WO | WO2013049482 A2 | 4/2013 |
| WO | WO2013067960 A1 | 5/2013 |
| WO | WO2013077862 A1 | 5/2013 |
| WO | WO2013102126 A1 | 7/2013 |
| WO | WO2014071746 A1 | 5/2014 |
| WO | WO2014159025 A1 | 10/2014 |
| WO | WO2015101351 A1 | 7/2015 |
| WO | WO2015132019 A1 | 9/2015 |
| WO | WO2015159025 A1 | 10/2015 |
| WO | WO2017174344 A1 | 10/2017 |
| WO | WO2017219570 A1 | 12/2017 |
| WO | WO2018078000 A1 | 5/2018 |

OTHER PUBLICATIONS

Dremel, "Versatile Tool Systems", 2011-2012, 9 pages.
Dremel, "8300", Owners Manual, 2011, 14 pages.
Porter Cable, "Oscillating Multi Tool" Product Information, 2012, 4 pages.
Bosch, "Power Tools and Accessories Catalog", 2012-2013, pp. 193-206.
Rockwell, "Sonicrafter RK5139K" Owners Manual, 2012, 24 pages.
Rockwell, "Sonicrafter Accessories", website publicly available as early as Feb. 2011, 5 pages.
Docutpro, "Accesory from DoCut Tools Company", <http://www.multitoolblades.cn/catalogue/catalogue.html>, website publicly available as early as Jun. 21, 2012, 4 pages.
Fratzel, "New Rockwell Oscillating Tools Offer Universal Fit and Tool—Free Design", Toolbox Buzz, <https://www.toolboxbuzz.com/uncategorized/new-rockwell-oscillating-tools-universal-fit-tool-free-design/>, published online Sep. 12, 2012 (6 pages).
Stuart, "Rockwell Sonicrafter Hyperlock and Universal Fit Oscillating Tools", ToolGuyd, <https://toolguyd.com/rockwell-sonicrafter-hyperlock/>, published online Sep. 20, 2012 (11 pages).
Makita, Multitool, Product Information, 2012, 2 pages.
Fein, "Multimaster Catalog", 2011, 38 pages.
Fitzall Blades, "Universal Replacement Oscillating Multi Tool Blades", <https://fitzallblades.com/>, 2012, 5 pages.
My Tool Shed, "Multi-Function Tools", <https://www.mytoolshed.co.uk/power-tools-home/multi-function-tools-engravers/multi-function-tools>, website publicly available as early as 2012, 8 pages.
Amazon, "Versa Tool MBMASTER 13Pcs Blade Set for Ridgid Oscillating Tools ABMaster", <https://www.amazon.com/Versa-MBMASTER-Ridgid-Oscillating-ABMASTER/dp/B002SHJA8Q/ref=sr_1_1?dchild=1&keywords=versa+tool+mbmaster+13pcs&qid=1602796501&sr=8-1>, website publicly available at least as early as 2009, 4 pages.
Amazon, "Rockwell RW8935 1-3/8-Inch Sonicrafter Oscillating Multitool Precision Wood End Cut Saw Blade with Universal Fit System", website publicly available at least as early as Aug. 2012, 7 pages.
International Search Report and Written Opinion for Application No. PCT/US2021/058579 dated Feb. 25, 2022 (11 pages).

(56) References Cited

OTHER PUBLICATIONS

Images of oscillating multi tool blades, available as early as Dec. 4, 2018 (1 page).

* cited by examiner

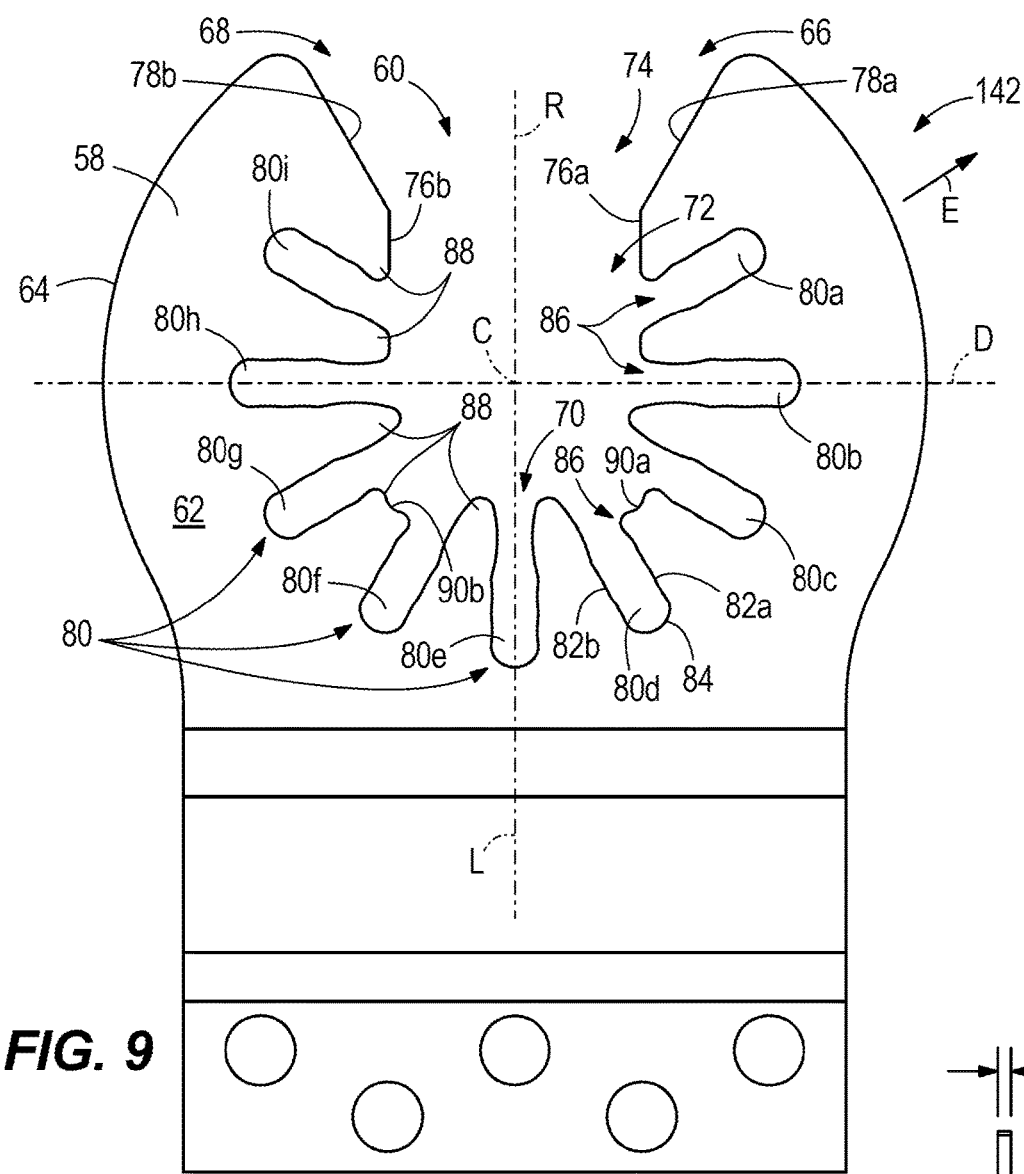
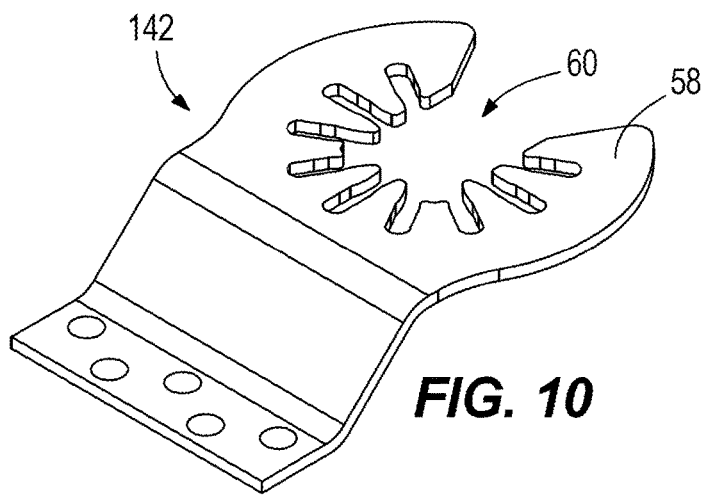
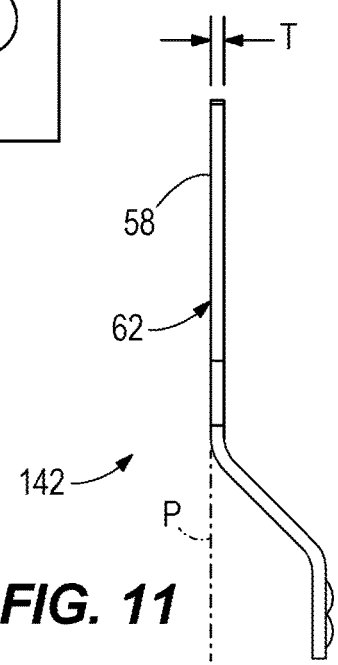
FIG. 9
FIG. 10
FIG. 11

US 11,738,398 B2

ACCESSORY FOR AN OSCILLATING POWER TOOL

CROSS-REFERENCE TO RELATED APPLICATIONS

This application is a national phase filing under 35 U.S.C. 371 of International Application No. PCT/US2021/058579 filed Nov. 9, 2021, which claims the priority benefit of U.S. Provisional Patent Appl. No. 63/115,214, filed Nov. 18, 2020, the content of which is incorporated fully herein by reference.

BACKGROUND OF THE DISCLOSURE

The present disclosure relates to an accessory for power tools, and more particularly to an interface for coupling the accessory to an oscillating power tool.

SUMMARY

In one aspect, the disclosure provides an anchor for selectively coupling with an oscillating power tool. The anchor includes a generally planar portion having an anchor interface configured to couple to the oscillating power tool and defining a longitudinal axis and a center point. The anchor interface includes a central aperture and a plurality of peripheral openings. The central aperture includes the center point therein. The plurality of peripheral openings is disposed radially about the center point and in communication with the central aperture. The plurality of peripheral openings also includes at least one conjoined group of peripheral openings collectively in communication with the central aperture by way of a shared neck opening. The at least one conjoined group includes a first peripheral opening, a second peripheral opening, and a third peripheral opening.

In another aspect, the disclosure provides an anchor for selectively coupling with an oscillating power tool. The anchor includes a generally planar portion having an anchor interface configured to couple to the oscillating power tool and defining a longitudinal axis and a center point. The anchor interface includes a central aperture and a plurality of peripheral openings. The center point is disposed in the central aperture. The plurality of peripheral openings are disposed radially about the center point. The plurality of peripheral openings includes at least one conjoined group of peripheral openings including at least a first and a second of the plurality of peripheral openings. The first and second of the plurality of peripheral openings are in communication with each other by way of a connecting aperture. The connecting aperture has a generally trapezoidal shape defined by a pair of non-parallel sidewalls each extending from the first of the plurality of peripheral openings to the second of the plurality of peripheral openings.

In another aspect, the disclosure provides an anchor for selectively coupling with an oscillating power tool. The anchor includes a generally planar portion having an anchor interface configured to couple to the oscillating power tool and defining a longitudinal axis and a center point. The anchor interface includes a central aperture and a plurality of peripheral openings. The center point is disposed in the central aperture. The plurality of peripheral openings are disposed radially about the center point. The plurality of peripheral openings includes at least one conjoined group of peripheral openings. The at least one conjoined group of peripheral openings includes at least two of the plurality of peripheral openings connected to each other by a connecting aperture. The connecting aperture is disposed at a radially outermost end of the at least two of the plurality of peripheral openings.

BRIEF DESCRIPTION OF THE DRAWINGS

FIG. 9 is a top view of an accessory anchor portion attachable to the oscillating power tool of FIG. 1 according to one implementation of the disclosure.

FIG. 10 is a top perspective view of the accessory anchor portion of FIG. 9.

FIG. 11 is a right side view of the accessory anchor portion of FIG. 9.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. The terms "substantially" and "generally" may be used herein to encompass "exactly" and "approximately".

Figure 1:
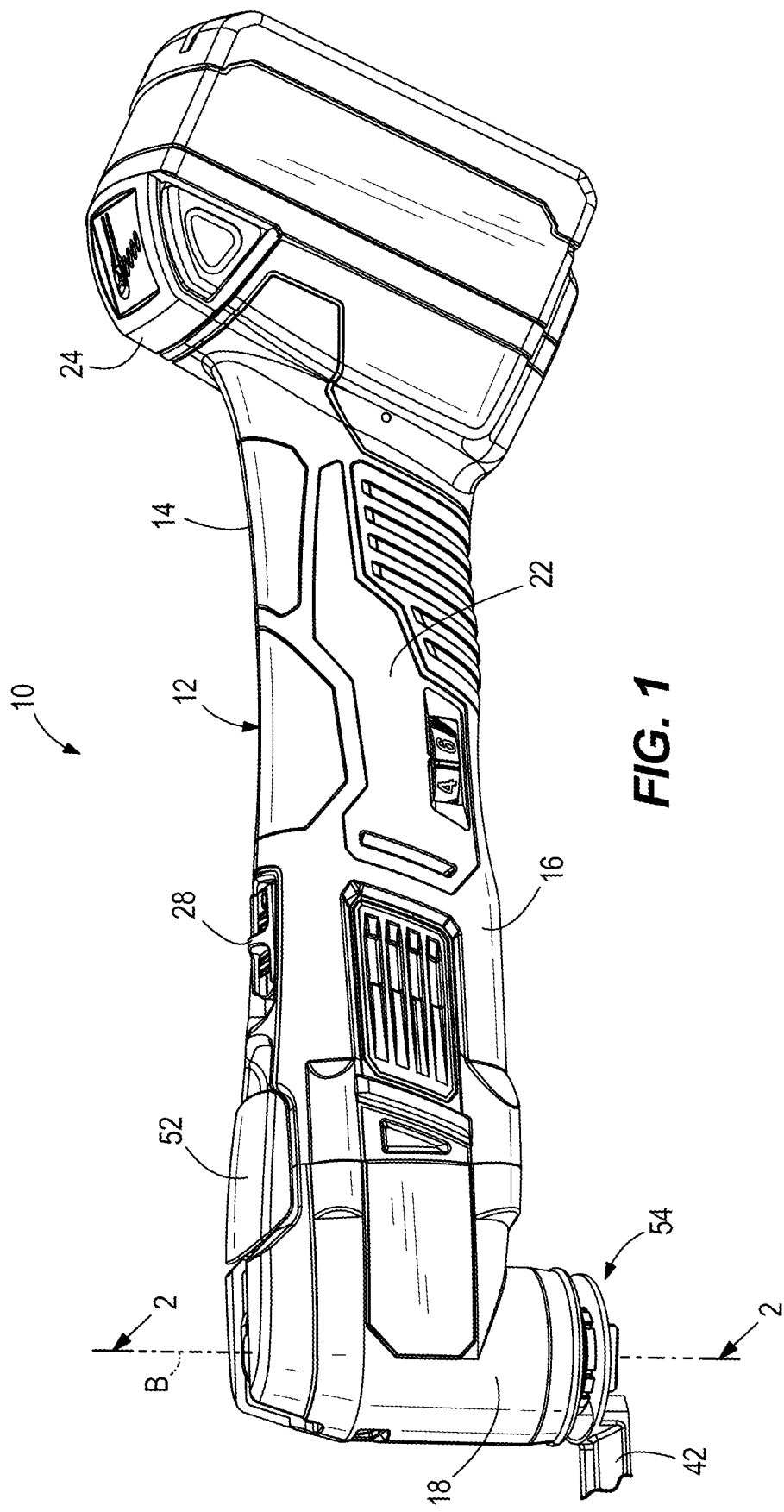
FIG. 1 is a side perspective view of an oscillating power tool for receiving interchangeable accessories, such as blades.

FIG. 1 illustrates a power tool 10 according to one implementation of the disclosure. The power tool 10 includes a main body 12 having a housing 14 defining a handle 16 and a head 18. The head 18 is driven by a motor 20 (FIG. 2) disposed within the housing 14. The handle 16 includes a grip portion 22 providing a surface suitable for grasping by an operator to operate the power tool 10. The housing 14 generally encloses the motor 20.

The motor 20 in the illustrated implementation is an electric motor driven by a power source such as a battery pack 24 (FIG. 1), but may be powered by other power sources such as an AC power cord in other implementations. In yet other implementations, the power tool 10 may be pneumatically powered or powered by any other suitable power source and the motor 20 may be a pneumatic motor or other suitable type of motor. The motor 20 includes a motor drive shaft 26 (FIG. 2) extending therefrom and driven for rotation about a motor axis A. The motor 20 may be a variable speed or multi-speed motor. In other implementations, other suitable motors may be employed.

The battery pack 24 (FIG. 1) is a removable and rechargeable battery pack. In the illustrated implementation, the battery pack 24 may include a 12-volt battery pack, a 14.4-volt battery pack, an 18-volt battery pack, or any other suitable voltage, and includes Lithium-ion battery cells (not shown). Additionally or alternatively, the battery cells may have chemistries other than Lithium-ion such as, for example, Nickel Cadmium, Nickel Metal-Hydride, or the like. In other implementations, other suitable batteries and battery packs may be employed.

The main body 12 also includes a power actuator 28 (FIG. 1). The power actuator 28 is movably coupled with the housing 14 and is actuatable to power the motor 20, e.g., to electrically couple the battery pack 24 and the motor 20 to run the motor 20. The power actuator 28 may be a sliding actuator as shown, or in other implementations may include a trigger-style actuator, a button, a lever, a knob, etc.

Figure 2:
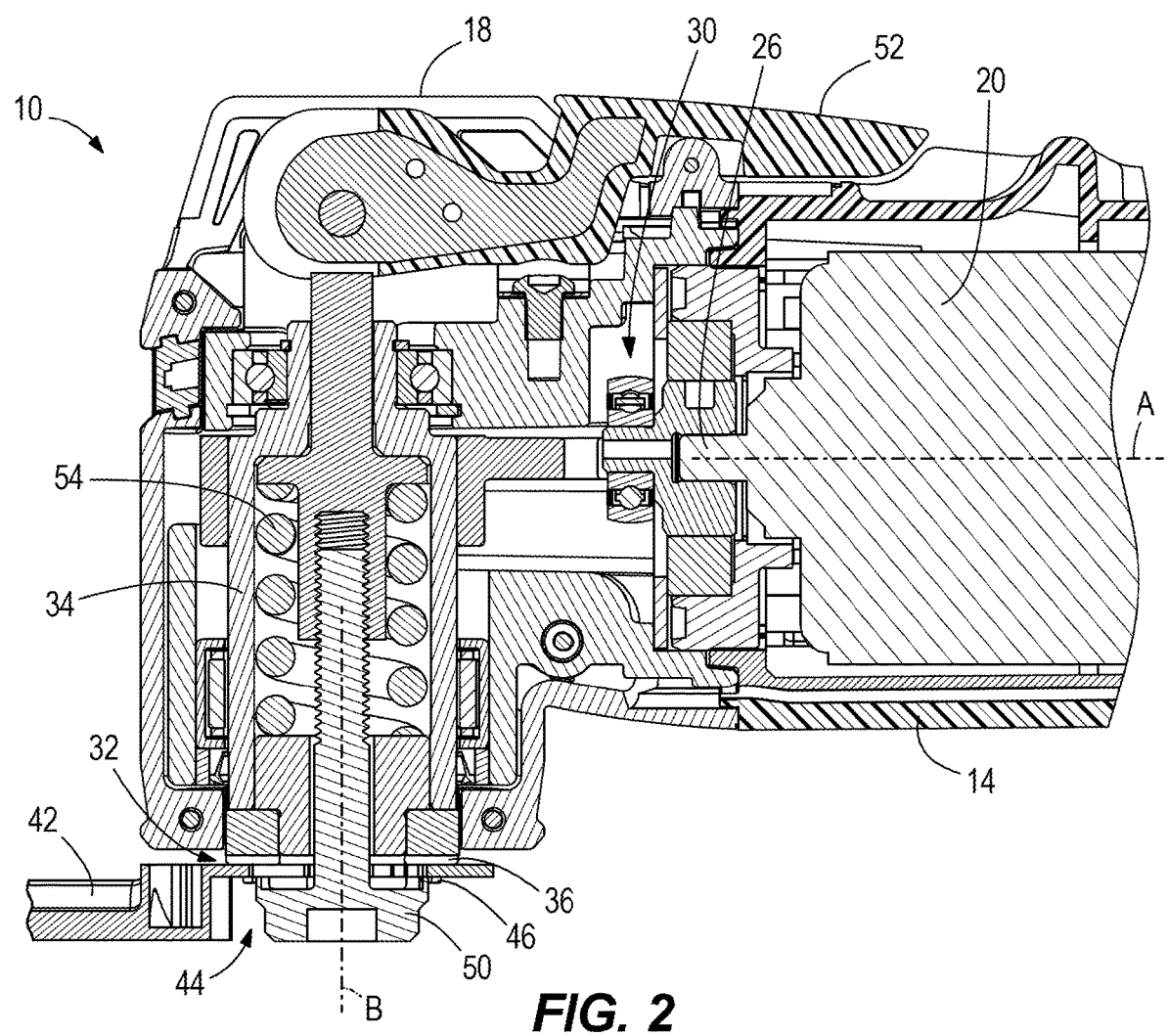
FIG. 2 is a side view cross-section of a head portion of the oscillating power tool of FIG. 1 taken through lines 2-2 in FIG. 1.
Figure 3:
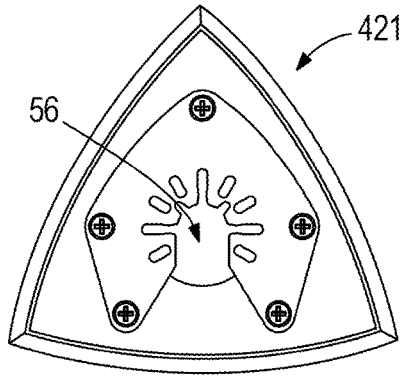
FIG. 3 is a top view of a prior art sanding pad attachable to the oscillating power tool of FIG. 1.
Figure 4:
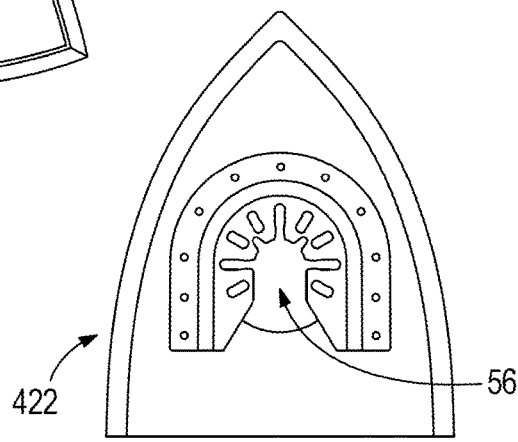
FIG. 4 is a top view of a prior art grit blade attachable to the oscillating power tool of FIG. 1.
Figure 5:
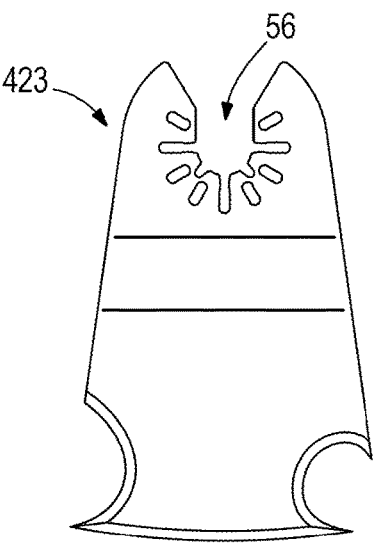
FIG. 5 is a top view of a prior art combination cutter and scraper blade attachable to the oscillating power tool of FIG. 1.
Figure 6:
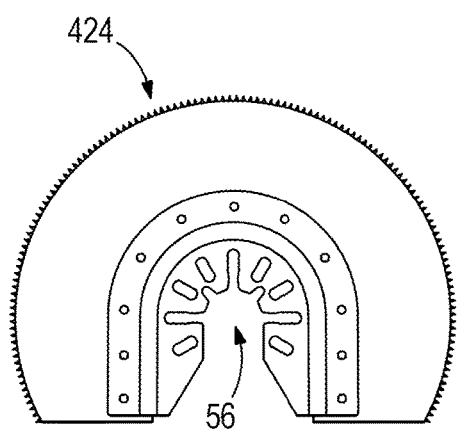
FIG. 6 is a top view of a prior art blade attachable to the oscillating power tool of FIG. 1.
Figure 7:
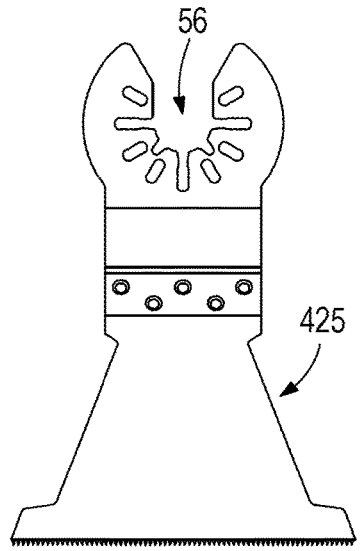
FIG. 7 is a top view of a prior art blade attachable to the oscillating power tool of FIG. 1.
Figure 8:
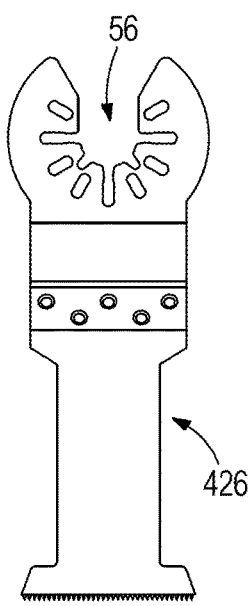
FIG. 8 is a top view of a prior art blade attachable to the oscillating power tool of FIG. 1.

The housing 14 also houses a drive mechanism 30 (FIG. 2) for converting rotary motion of the motor drive shaft 26 into oscillating motion of an output mechanism 32. As shown in FIG. 2, the output mechanism 32 includes a spindle 34 having an accessory holder 36 disposed at a distal end thereof. As shown in FIG. 2, the spindle 34 terminates, at a free end, with the accessory holder 36. The accessory holder 36 is configured to receive an accessory 42, such as a blade (as shown), a sanding pad (FIG. 3), a grit blade (FIG. 4), a combination cutter and scraper (FIG. 5), a semi-circular blade (FIG. 6), an elongated blade (FIGS. 7-8), a circular blade, a grinding pad, a grinding disc, a knife, a cutter, a scraper, or any other accessory suitable for performing an operation in oscillation. A clamping mechanism 44 (FIG. 2) clamps the accessory 42 to the accessory holder 36. Specifically, the accessory holder 36 includes one or more locating features 46, such as a protrusion or protrusions sized and shaped for receiving the accessory 42. The clamping mechanism 44 includes a clamping flange 50 at a distal end thereof for clamping the accessory 42 to the accessory holder 36 for oscillating motion with the spindle 34. A clamping actuator 52, such as a lever, is configured to apply and release a clamping force from a biasing member 54, such as a spring. The spindle 34 defines an oscillation axis B, substantially perpendicular to the motor axis A, about which the spindle 34 oscillates, as will be described in greater detail below. In other implementations, other clamping actuators may be employed, such as a button, a knob, etc.

FIGS. 3-8 illustrate accessories 421-426 each interchangeably attachable to the power tool 10, each of the accessories 421-426 having a prior art anchor interface 56.

FIGS. 9-11 illustrate an anchor portion 58 of a portion of an accessory 142, the anchor portion 58 having an anchor interface 60 according to one implementation of the disclosure. The anchor interface 60 may be employed on any accessory attachable to the power tool 10, such as but not limited to the accessories 42 and 421-426 illustrated in FIGS. 2-8 (e.g., in place of the prior art anchor interface 56), other accessories discussed above, and others.

The anchor portion 58 includes a generally planar portion of material 62, such as a metal, a metal alloy, a bi-metal, or any combination of metals, metal alloys, bi-metals, etc. For example, the metal may include hardened steel, carbide, etc. The anchor portion 58 may be formed from other materials, such as a polymer, a composite, etc., in other implementations. The anchor portion 58 has a thickness T (FIG. 11) in a direction perpendicular to a plane P (FIG. 11) of the generally planar portion of material 62. The anchor portion 58 includes an outer edge 64 forming a boundary of the generally planar portion of material 62 in the plane R The anchor portion 58 is stepped in the illustrated implementation, as best illustrated in FIG. 11, but may be entirely generally planar in other implementations (such as the accessory 42 illustrated in FIG. 2), depending on the type of accessory with which the anchor portion 58 is employed.

The anchor interface 60 includes an open aperture 66 open to the outer edge 64. In other words, the open aperture 66 is not enclosed by the anchor portion 58 but is formed having an open end 68 in communication with the environment E surrounding the anchor portion 58 in the plane P. "Communication" is used herein to mean, for example, air flow communication between one aperture/opening and the environment E within the plane P, or between one aperture/opening and another aperture/opening within the plane P. The open aperture 66 also includes a closed end 70 opposite the open end 68. A longitudinal axis L extends from the closed end 70 to the open end 68, generally longitudinally through the open aperture 66, and lies parallel to the plane P of the anchor portion 58. In the illustrated implementation, the longitudinal axis L is a midline of the open aperture 66 and the open aperture 66 is symmetrical about the longitudinal axis L. However, in other implementations the open aperture 66 need not be symmetrical and the longitudinal axis L may extend generally longitudinally through the open aperture 66. The open aperture 66 allows the anchor portion 58 to be attached to the power tool 10 from the side of the oscillation axis B, by movement in a direction transverse to the oscillation axis B between the accessory holder 36 and the clamping flange 50, and then into engagement with the accessory holder 36. The longitudinal axis L may coincide with an overall longitudinal axis (not shown) of the accessory 42, 421-426 with which it is employed in some implementations, but may be disposed at any angle with respect to the overall longitudinal axis (not shown) of the accessory 42, 421-426 with which it is employed in other implementations. The open aperture 66 is a through-hole extending through the thickness T of the generally planar portion of material 62. The open aperture 66 may also be referred to as a "central aperture", and in some implementations the central aperture 66 may be a closed aperture that is enclosed by the anchor portion 58, i.e., is not in communication with the environment E surrounding the anchor portion 58 in the plane P.

The open aperture 66 has a generally Y-shape defined by a trunk portion 72 and a branch portion 74. The trunk portion 72 extends generally longitudinally from the closed end 70 towards the open end 68 and is at least partially defined by a pair of substantially parallel edges 76a, 76b. The branch portion 74 is defined by a pair of diverging edges 78a, 78b starting at an end of the substantially parallel edges 76a, 76b and diverging from each other to the open end 68. The substantially parallel edges 76a, 76b and the diverging edges 78a, 78b are each substantially straight in the illustrated implementation, but may be curved or irregularly shaped in other implementations. The open aperture 66 may have other shapes in other implementations, such as, but not limited to, the other shapes in the other implementations disclosed herein.

The anchor interface 60 also includes a plurality of peripheral openings 80 defined between a plurality of radial projections 88. The plurality of peripheral openings 80 extend generally radially with respect to a center C, each of which are independently in direct communication with the open aperture 66, i.e., each of the plurality of peripheral openings 80 has its own connection to the open aperture 66 independent from the other of the plurality of peripheral openings 80. The center C is disposed in the open aperture 66 and may coincide with the oscillation axis B when the anchor portion 58 is attached to the power tool 10. The plurality of peripheral openings 80 are through-holes extending through the thickness T of the generally planar portion of material 62 at a predetermined radial distance from the center C.

The plurality of peripheral openings 80 are disposed at 30 degree intervals about the center C from 60 degrees to 300 degrees, where the open end 68 is disposed at zero degrees and moving clockwise. The open end 68 being disposed at zero degrees means a zero-degree radial reference line R extends from the center C and intersects the open end 68 anywhere between the edges 76a, 76b. The zero-degree radial reference line R may coincide with the longitudinal axis L, as shown in the illustrated implementation, but need not coincide with the longitudinal axis L in other implementations. For example, in such other implementations, the zero-degree radial reference line R may extend from the center C through the open end 68 closer to one of the edges 76a, 76b of the open aperture 66 than to the other one of the edges 76a, 76b.

Thus, the plurality of peripheral openings 80 includes nine peripheral openings including a first peripheral opening 80a at about 60 degrees, a second peripheral opening 80b at about 90 degrees, a third peripheral opening 80c at about 120 degrees, a fourth peripheral opening 80d at about 150 degrees, a fifth peripheral opening 80e at about 180 degrees, a sixth peripheral opening 80f at about 210 degrees, a seventh peripheral opening 80g at about 240 degrees, an eighth peripheral opening 80h at about 270 degrees, and a ninth peripheral opening 80i at about 300 degrees, each with respect to the zero-degree radial reference line R. In other implementations, the anchor interface 60 may include fewer or more than nine peripheral openings. For example, if the open aperture 66 is made narrower, the anchor interface 60 may include additional peripheral openings 80 at 30 degrees and/or at 330 degrees with respect to the zero-degree radial reference line R. In yet other implementations, the open aperture 66 may be a closed aperture (not shown) that is not open to the outer edge 64 such that further peripheral openings 80 are disposed at zero degrees, 30 degrees, and 330 degrees. In such an implementation, there would be additional material on the anchor interface 60 to create the added peripheral openings as a mirror image of the peripheral openings 80b-80h from 90 degrees to 270 degrees (e.g., the peripheral openings 80 from 90 degrees to 270 degrees) about a lateral axis D. The lateral axis D is perpendicular to the longitudinal axis L and intersects the center C.

In the illustrated implementation of FIGS. 9-11, the plurality of peripheral openings 80 are each connected to the open aperture 66 as radial arms extending radially from the open aperture 66 with respect to the center C. Each peripheral opening 80 is defined by a pair of sidewalls 82a, 82b, each sidewall 82a, 82b being substantially straight and disposed substantially parallel with respect to each other. Only one of the pairs of sidewalls 82a, 82b is labeled in FIG. 9 (i.e., on the fourth peripheral opening 80d) to avoid crowded reference numerals in the drawings, but it should be understood that each one of the peripheral openings 80a-80i (and other peripheral openings in other implementations) is defined by a respective pair of sidewalls 82a, 82b. Each pair of sidewalls 82a, 82b provides material on both circumferential sides (with respect to a circumference about the center C) of each of the peripheral openings 80 for a driving engagement between the locating features 46 (FIG. 2) projecting from the accessory holder 36 and the anchor portion 58 during oscillation of the accessory holder 36 in both rotational directions (e.g., clockwise and counterclockwise about the center C). In some implementations, the pair of sidewalls 82a, 82b may be curved. In some implementations, the pair of sidewalls 82a, 82b may be non-parallel. The sidewalls 82a, 82b are connected to each other at a radially distal end thereof by a rounded end wall 84 (also only labeled on the fourth peripheral opening 80d for clarity of the drawings but understood to be on every one of the peripheral openings 80). In some implementations, the end wall 84 may be substantially straight, may have a point or apex, or may have a curve or curves of any shape. Continuing to refer to FIG. 9, the planar portion 62 defines a neck opening 86 (only labeled on the first, second, and fourth peripheral openings 80a, 80b, 80d for clarity but understood to be associated with each one of the peripheral openings 80) disposed between the open aperture 66 and each one of the peripheral openings 80. Each neck opening 86 defines a channel that connects each respective one of the plurality of peripheral openings 80 to the open aperture 66 such that each peripheral opening 80 is in communication with the open aperture 66. In the illustrated implementation, there is one neck opening 86 for every peripheral opening 80. In the illustrated implementation, the neck opening 86 is narrower than the pair of sidewalls 82a, 82b. However, in other implementations, the neck opening 86 may be the same width as the pair of sidewalls 82a, 82b, or may be wider than the pair of sidewalls 82a, 82b, and may have other shapes in other implementations. In the illustrated implementation, all of the neck openings 86 are narrower than the respective pair of sidewalls 82a, 82b. In yet other implementations, some of the neck openings 86 may have different widths from others of the neck openings 86.

The generally planar portion of material 62 includes radial projections 88 extending towards the center C. The plurality of peripheral openings 80 are defined between each immediately adjacent pair of radial projections 88. For clarity of the drawings, only the projections 88 on the left side of the longitudinal axis L are labeled in FIG. 9; however, it should be understood that the right side includes further projections 88 as a mirror image thereof. The projections 88 provide material between the peripheral openings 80. At least some of the projections 88 at least partially define the generally longitudinal shape of the trunk portion 72 of the open aperture 66 at their respective distal ends closest to the center C. In other words, at least some of the projections 88 terminate along generally the same longitudinal-shaped path initiated by the generally parallel edges 76a, 76b. Slight deviations from a perfect longitudinal shape may exist (as shown), though the shape is still recognizable as generally longitudinal. In other implementations, other slight variations may exist.

The anchor interface 60 also includes a first concave dimple 90a in one of the projections 88 at 135 degrees and a second concave dimple 90b in another one of the projections 88 at 225 degrees with respect to the zero-degree radial reference line R. The first and second concave dimples 90a, 90b are each formed in the respective one of the projections 88. The first and second concave dimples 90a, 90b may each have a curved shape (as illustrated), such as an arc shape or other curved shape. In other implementations, the first and second concave dimples 90a, 90b may have a pointed shape, or any other concave shape.

Figure 12:
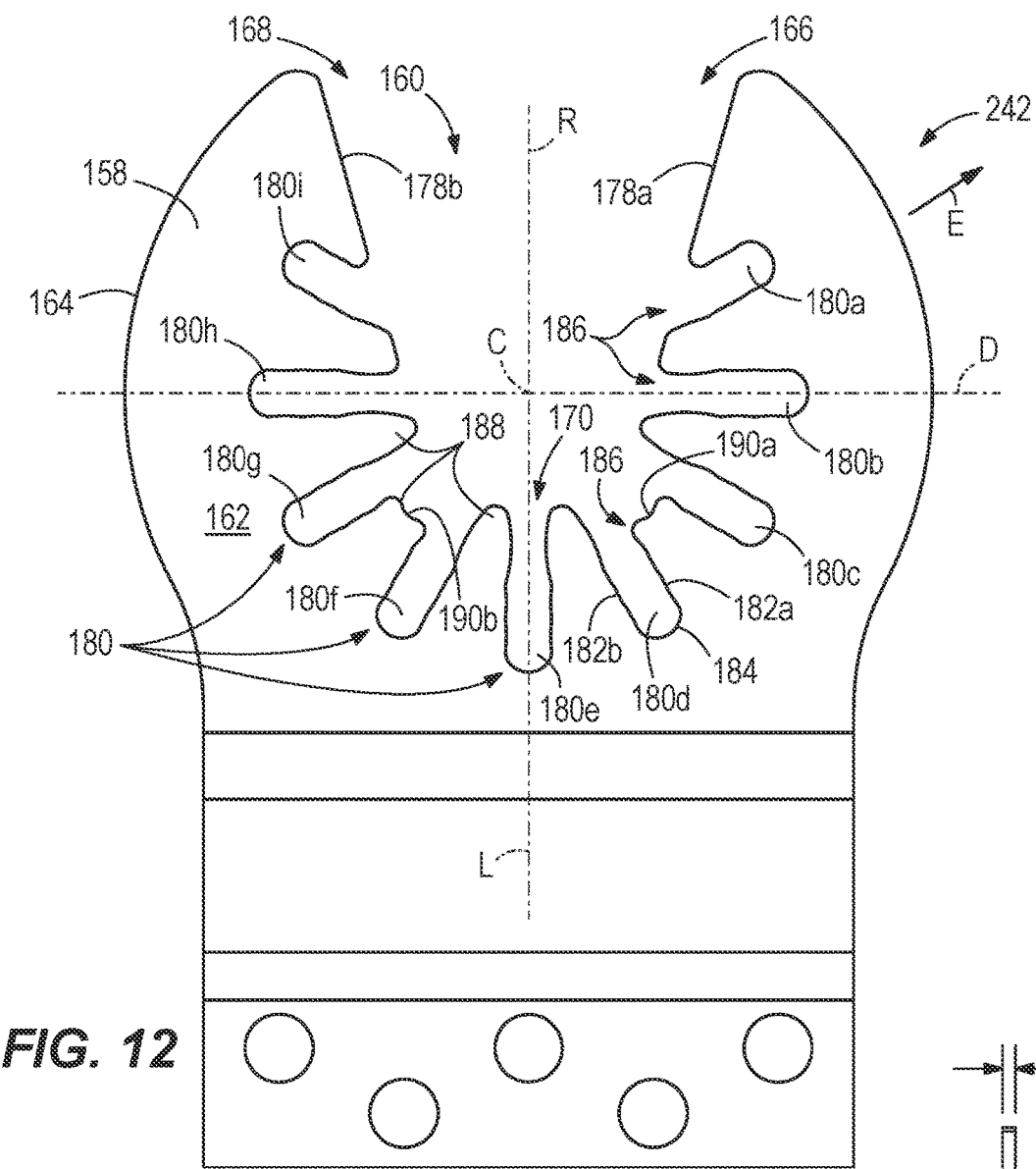
FIG. 12 is a top view of an accessory anchor portion attachable to the oscillating power tool of FIG. 1 according to another implementation of the disclosure.
Figure 13:
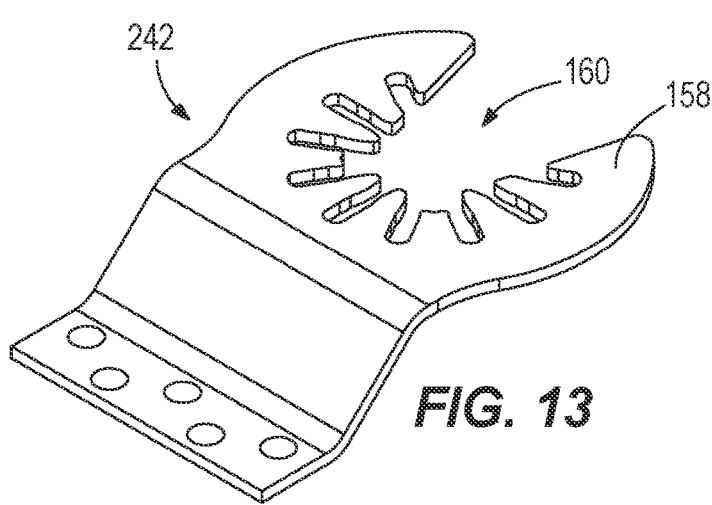
FIG. 13 is a top perspective view of the accessory anchor portion of FIG. 12.
Figure 14:
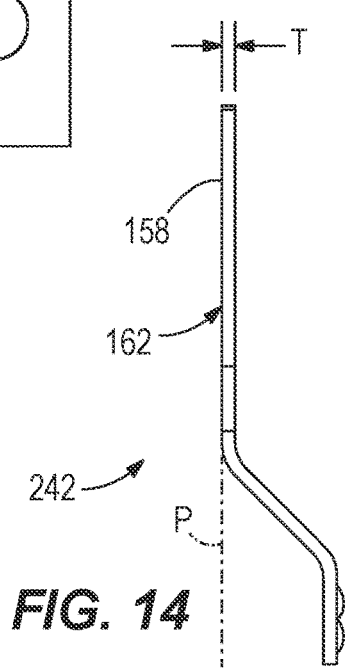
FIG. 14 is a right side view of the accessory anchor portion of FIG. 12.

FIGS. 12-14 illustrate an anchor portion 158 having an anchor interface 160 according to another implementation of the disclosure. The anchor interface 160 is the same as the anchor interface 60 described above except that the shape of the open apertures 66, 166 is different. For example, more material is removed to form the open aperture 166 than the open aperture 66. As such, the remaining common features having reference numerals in FIGS. 9-11 are labeled in FIGS. 12-14 with the same reference numeral plus "100" and need not be described again. Reference is made to the description above including the original reference numerals. Differences in the shape of the open aperture 166 are described below.

The open aperture 166 has a generally trapezoidal shape at least partially defined by a pair of diverging edges 178a, 178b diverging from each other to the open end 168. The diverging edges 178a, 178b are each substantially straight in the illustrated implementation, but may be curved or irregularly shaped in other implementations.

In addition to the diverging edges 178a, 178b, each of the projections also at least partially define the generally trapezoidal shape of the open aperture 166 at their respective distal ends closest to the center C. In other words, the projections terminate generally along the same trapezoidal-shaped path initiated by the diverging edges 178a, 178b. Slight deviations from a perfect trapezoidal shape may exist (as shown), though the shape is still recognizable as generally trapezoidal. In other implementations, other slight variations may exist.

The neck openings 186 for the first and ninth peripheral openings 180a, 180i may be wider than the pair of sidewalls 182a, 182b defining the first and ninth peripheral openings 180a, 180i due to the diverging edges 178a, 178b being spaced farther apart such that more material is removed adjacent the first and ninth peripheral openings 180a, 180i.

Figure 15:
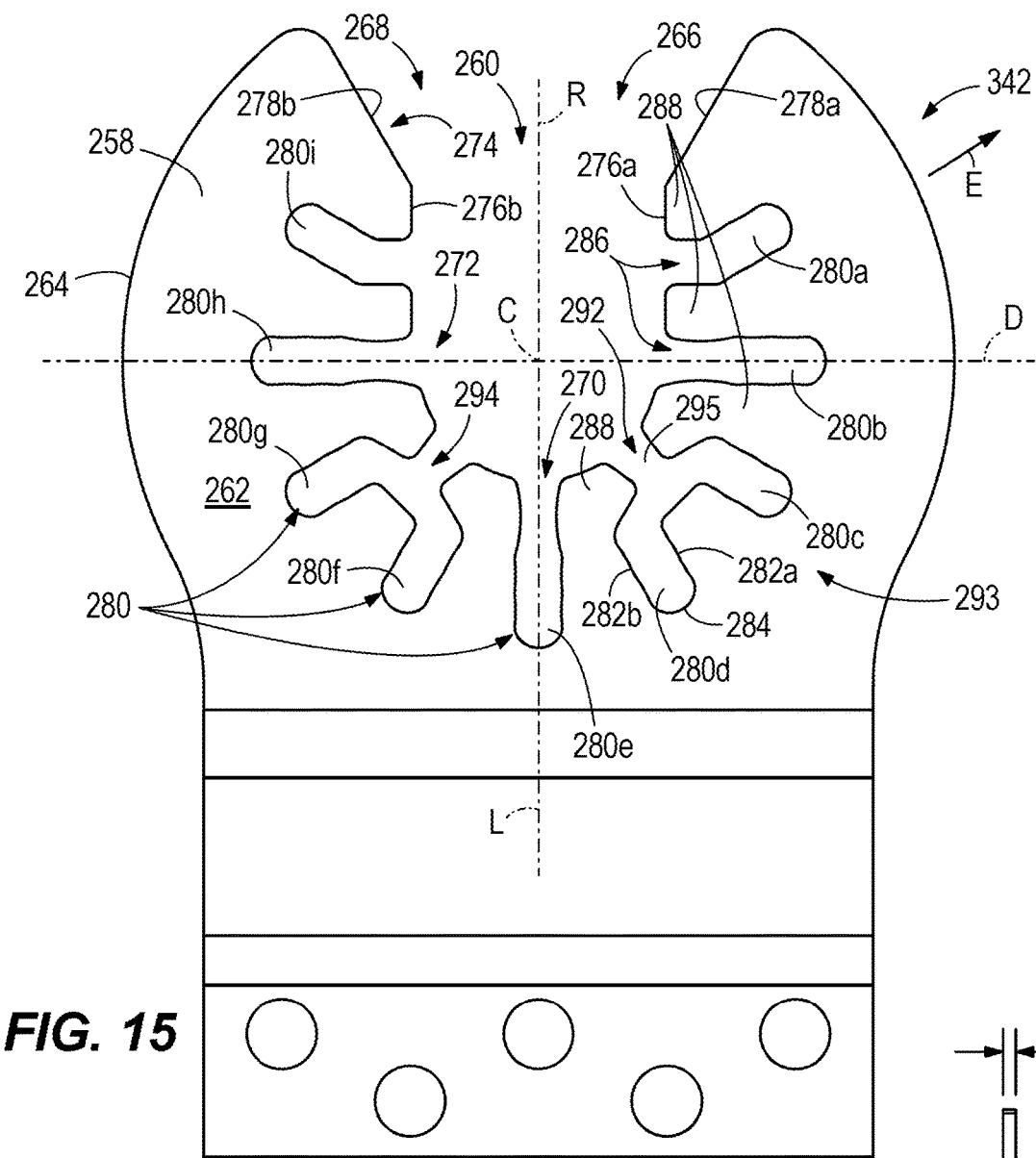
FIG. 15 is a top view of an accessory anchor portion attachable to the oscillating power tool of FIG. 1 according to one implementation of the disclosure.
Figure 16:
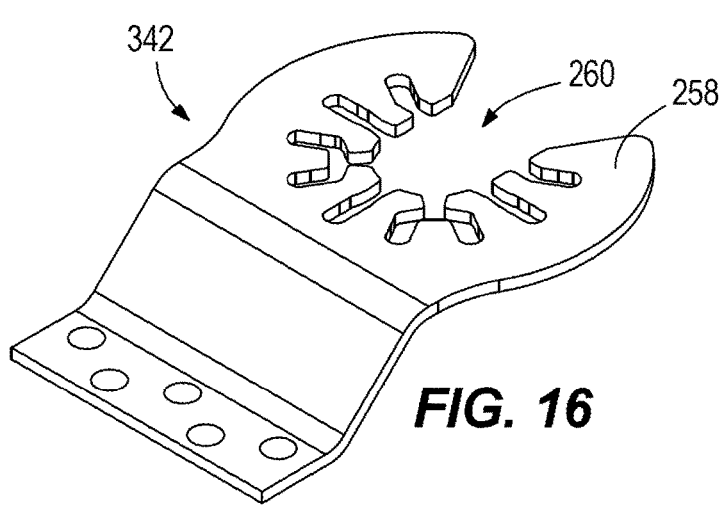
FIG. 16 is a top perspective view of the accessory anchor portion of FIG. 15.
Figure 17:
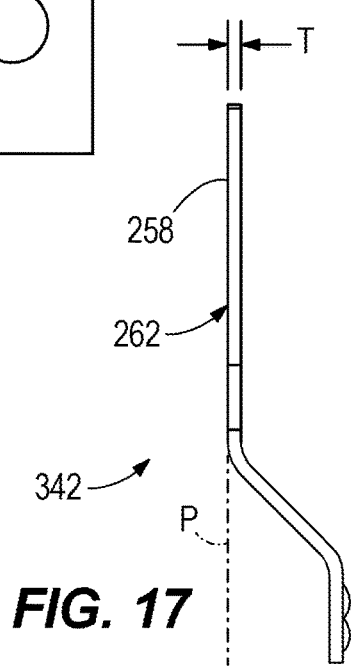
FIG. 17 is a right side view of the accessory anchor portion of FIG. 15.

FIGS. 15-17 illustrate an anchor portion 258 of a portion of an accessory 342, the anchor portion 258 having an anchor interface 260 according to one implementation of the disclosure. The anchor interface 260 may be employed on any accessory attachable to the power tool 10, such as but not limited to the accessories 42 and 421-426 illustrated in FIGS. 2-8 (e.g., in place of the prior art anchor interface 56), other accessories discussed above, and others.

The anchor portion 258 includes a generally planar portion of material 262, such as a metal, a metal alloy, a bi-metal, or any combination of metals, metal alloys, bi-metals, etc. For example, the metal may include hardened steel, carbide, etc. The anchor portion 258 may be formed from other materials, such as a polymer, a composite, etc., in other implementations. The anchor portion 258 has a thickness T (FIG. 17) in a direction perpendicular to a plane P (FIG. 17) of the generally planar portion of material 262. The anchor portion 258 includes an outer edge 264 forming a boundary of the generally planar portion of material 262. The anchor portion 258 is stepped in the illustrated implementation, as best illustrated in FIG. 17, but may be entirely generally planar in other implementations (such as the accessory 42 illustrated in FIG. 2), depending on the type of accessory with which the anchor portion 258 is employed.

The anchor interface 260 includes an open aperture 266 open to the outer edge 264. In other words, the open aperture 266 is not enclosed by the anchor portion 258 but is formed having an open end 268 in communication with the environment E surrounding the anchor portion 258 in the plane P. The open aperture 266 also includes a closed end 270 opposite the open end 268. A longitudinal axis L extends from the closed end 270 to the open end 268, generally longitudinally through the open aperture 266, and lies parallel to the plane P of the anchor portion 258. In the illustrated implementation, the longitudinal axis L is a midline of the open aperture 266 and the open aperture 266 is symmetrical about the longitudinal axis L. However, in other implementations the open aperture 266 need not be symmetrical and the longitudinal axis L may extend generally longitudinally through the open aperture 266. The open aperture 266 allows the anchor portion 258 to be attached to the power tool 10 from the side of the oscillation axis B, by movement in a direction transverse to the oscillation axis B between the accessory holder 36 and the clamping flange 50, and then into engagement with the accessory holder 36. The longitudinal axis L may coincide with an overall longitudinal axis (not shown) of the accessory 42, 421-426 with which it is employed in some implementations, but may be disposed at any angle with respect to the overall longitudinal axis (not shown) of the accessory 42, 421-426 with which it is employed in other implementations. The open aperture 266 is a through-hole extending through the thickness T of the generally planar portion of material 262.

The open aperture 266 has a generally Y-shape defined by a trunk portion 272 and a branch portion 274. The trunk portion 272 extends generally longitudinally from the closed end 270 towards the open end 268 and is at least partially defined by a pair of substantially parallel edges 276a, 276b. The trunk portion 272 at the closed end 270 is curved, e.g., generally semi-circular as illustrated, such that the trunk portion 272 has a generally U-shape. However, in other implementations, the trunk portion 272 may have other shapes such as other curves, polygons, or may be generally straight. The branch portion 274 is defined by a pair of diverging edges 278a, 278b starting at an end of the substantially parallel edges 276a, 276b and diverging from each other to the open end 268. The substantially parallel edges 276a, 276b and the diverging edges 278a, 278b are each substantially straight in the illustrated implementation, but may be curved or irregularly shaped in other implementations. The open aperture 266 may have other shapes in other implementations, such as, but not limited to, the other shapes in the other implementations disclosed herein.

The anchor interface 260 also includes a plurality of peripheral openings 280 extending generally radially with respect to a center C, all of which are in communication with the open aperture 266. The center C is disposed in the open aperture 266 and may coincide with the oscillation axis B when the anchor portion 58 is attached to the power tool 10. The plurality of peripheral openings 280 are through-holes extending through the thickness T of the generally planar portion of material 262 at a predetermined radial distance from the center C.

The plurality of peripheral openings 280 are disposed at 30 degree intervals about the center C from 60 degrees to 300 degrees, where the open end 268 is disposed at zero degrees and moving clockwise. The open end 268 being disposed at zero degrees means a zero-degree radial reference line R extends from the center C and intersects the open end 268 anywhere between the edges 276a, 276b. The zero-degree radial reference line R may coincide with the longitudinal axis L, as shown in the illustrated implementation, but need not coincide with the longitudinal axis L in other implementations. For example, in such other implementations, the zero-degree radial reference line R may extend from the center C through the open end 268 closer to one of the edges 276a, 276b of the open aperture 266 than to the other one of the edges 276a, 276b.

Thus, the plurality of peripheral openings 280 includes nine peripheral openings including a first peripheral opening 280a at about 60 degrees, a second peripheral opening 280b at about 90 degrees, a third peripheral opening 280c at about 120 degrees, a fourth peripheral opening 280d at about 150 degrees, a fifth peripheral opening 280e at about 180 degrees, a sixth peripheral opening 280f at about 210 degrees, a seventh peripheral opening 280g at about 240 degrees, an eighth peripheral opening 280h at about 270 degrees, and a ninth peripheral opening 280i at about 300 degrees, each with respect to the zero-degree radial reference line R. In other implementations, the anchor interface 260 may include fewer or more than nine peripheral openings. For example, if the open aperture 266 is made narrower, the anchor interface 260 may include additional peripheral openings 280 at 30 degrees and/or at 330 degrees with respect to the zero-degree radial reference line R. In yet other implementations, the open aperture 266 may be a closed aperture (not shown) that is not open to the outer edge 264 such that further peripheral openings 80 are disposed at zero degrees, 30 degrees, and 330 degrees. In such an implementation, there would be additional material on the anchor interface 260 to create the added peripheral openings as a mirror image of the peripheral openings 280b-280h (e.g., the peripheral openings 280 from 90 degrees to 270 degrees) about a lateral axis D. The lateral axis D is perpendicular to the longitudinal axis L and intersects the center C.

In the illustrated implementation of FIGS. 15-17, the plurality of peripheral openings 280 are each connected to the open aperture 266. Each peripheral opening 280 is defined by a pair of sidewalls 282a, 282b, each sidewall 282a, 282b being substantially straight and disposed substantially parallel with respect to each other. Only one of the pairs of sidewalls 282a, 282b is labeled in FIG. 15 (i.e., on the fourth peripheral opening 280d) to avoid crowded reference numerals in the drawings, but it should be understood that each one of the peripheral openings 280a-280i (and other peripheral openings in other implementations) is defined by a respective pair of sidewalls 282a, 282b. Each pair of sidewalls 282a, 282b provides material on both circumferential sides (with respect to a circumference about the center C) of each of the peripheral openings 280 for a driving engagement between the locating features 46 (FIG. 2) projecting from the accessory holder 36 and the anchor portion 258 during oscillation of the accessory holder 36 in two rotational directions (e.g., clockwise and counterclockwise about the center C). In some implementations, the pair of sidewalls 282a, 282b may be curved. In some implementations, the pair of sidewalls 282a, 282b may be non-parallel. The sidewalls 282a, 282b are connected to each other at a radially distal end thereof by a rounded end wall 284 (also only labeled on the fourth peripheral opening 280d for clarity of the drawings but understood to be associated with each one of the peripheral openings 280). In some implementations, the end wall 284 may be substantially straight, may have a point or apex, or may have a curve or curves of any shape.

A neck opening 286 (only labeled on the first and second peripheral openings 280a, 280b for clarity but understood to be associated with each one of the peripheral openings 280a, 280b, 280e, 280h, 280i) is disposed between the open aperture 266 and each of the first, second, fifth, eighth, and ninth peripheral openings 280a, 280b, 280e, 280h, 280i. Each neck opening 286 connects each respective first, second, fifth, eighth, and ninth peripheral openings 280a, 280b, 280e, 280h, 280i to the open aperture 266 such that each of the first, second, fifth, eighth, and ninth peripheral openings 280a, 280b, 280e, 280h, 280i is in communication with the open aperture 266. In the illustrated implementation, the neck opening 286 is narrower than the pair of sidewalls 282a, 282b for the second, fifth, and eighth peripheral openings 280b, 280e, 280h. The neck opening 286 has substantially the same width as the pair of sidewalls 282a, 282b for the first and ninth peripheral openings 280a, 280i but is disposed transverse to the peripheral opening 280a, 280i (as a bend formed at an angle with respect to the peripheral openings 280a, 280i) rather than aligned therewith. In other implementations, the neck openings 286 may have other widths, shapes, and combinations of widths and shapes from one peripheral opening to the next.

A first shared neck opening 292 is disposed in communication between the open aperture 266 and an immediately adjacent pair 293 of peripheral openings 280, such as the third and fourth peripheral openings 280c, 280d, but the immediately adjacent pair 293 of peripheral openings 280 may be any pair of immediately adjacent peripheral openings. In other constructions, the pair 293 need not be immediately adjacent. The first shared neck opening 292 has a generally branched shape starting with a common trunk 295 at 135 degrees (midway between the angular locations of the immediately adjacent pair 293 of peripheral openings 280) and branching generally laterally therefrom in two directions to connect the open aperture 266 through to the third and fourth peripheral openings 280c, 280d by way of the common trunk 295. Thus, the immediately adjacent pair 293 of peripheral openings 280 define a pair of conjoined openings. The pair 293 of peripheral openings are conjoined, such that they are in communication with each other outside of the open aperture 266, and the first shared neck opening 292 provides communication between the immediately adjacent pair 293 and the open aperture 266. A second shared neck opening 294 in communication with the sixth and seventh peripheral openings 280f, 280g is mirrored on the other side of the longitudinal axis L and need not be described in detail again, though in some implementations, any other pair of immediately adjacent peripheral openings 280 may be connected with the second shared neck opening 294. In other implementations, the first and/or second shared neck opening 292, 294 may be connected with any two or more of the peripheral openings 280, whether immediately adjacent or not, in any combination.

The generally planar portion of material 262 includes projections 288 extending towards the center C between each immediately adjacent pair of peripheral openings 280. For clarity of the drawings, only the projections 288 on the right side of the longitudinal axis L are labeled in FIG. 15; however, it should be understood that the left side includes further projections 288 as a mirror image thereof. The projections 288 provide material between the peripheral openings 280 and at least partially define the generally longitudinal shape of the trunk portion 272 of the open aperture 266 at their respective distal ends closest to the center C. In other words, at least some of the projections 288 terminate along generally the same longitudinal-shaped path initiated by the generally parallel edges 276a, 276b. Slight deviations from a perfect longitudinal shape may exist, though the shape is still recognizable as generally longitudinal. In other implementations, other slight variations may exist. In the illustrated implementation, the material extending between the pair 293 towards the center C does not terminate at the open aperture 266 because the shared neck opening 292 truncates the material.

Figure 18:
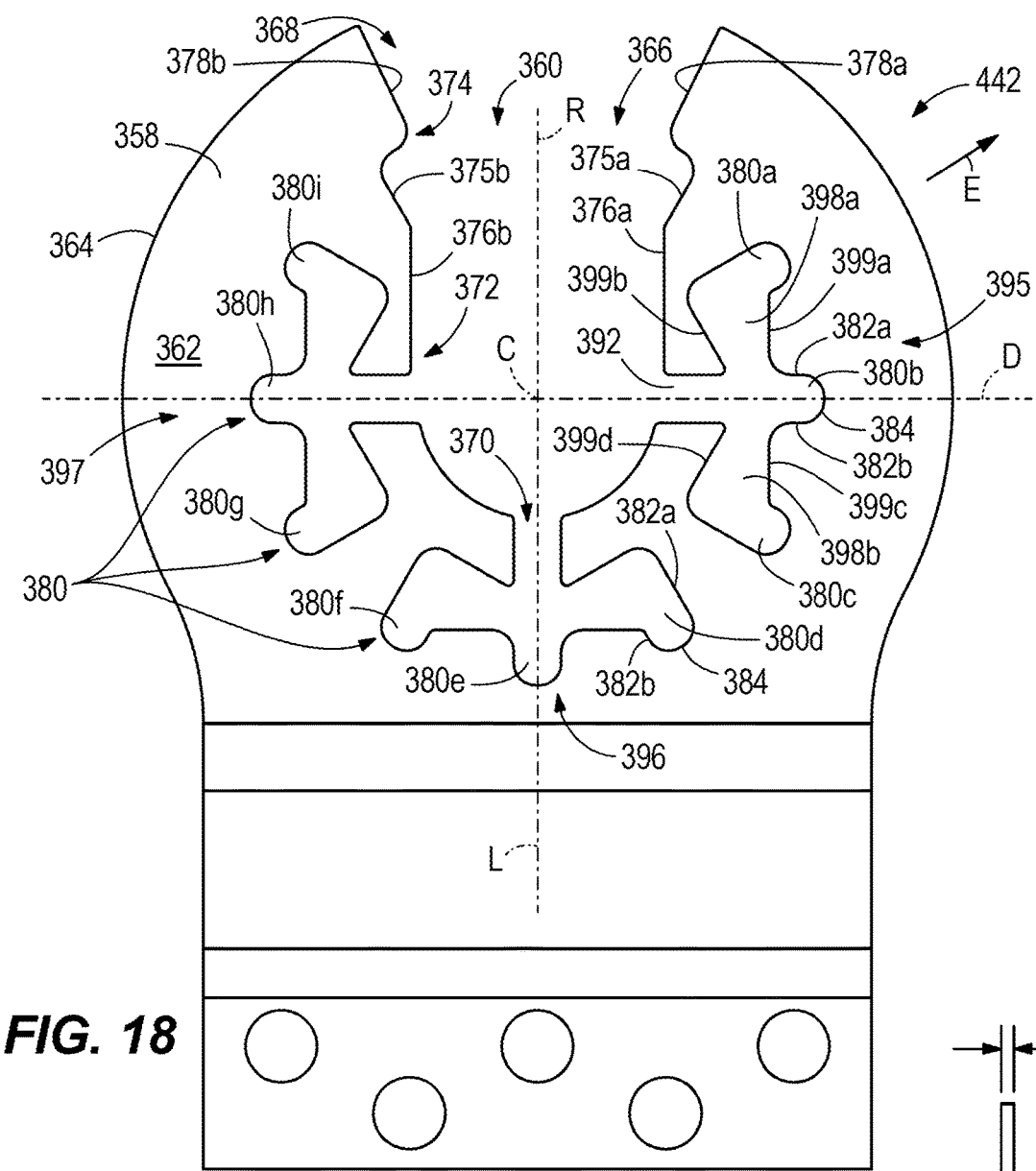
FIG. 18 is a top view of an accessory anchor portion attachable to the oscillating power tool of FIG. 1 according to one implementation of the disclosure.
Figure 19:
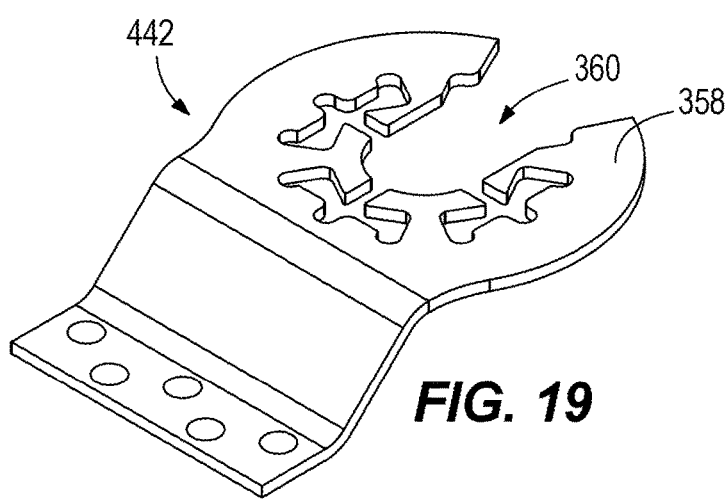
FIG. 19 is a top perspective view of the accessory anchor portion of FIG. 18.
Figure 20:
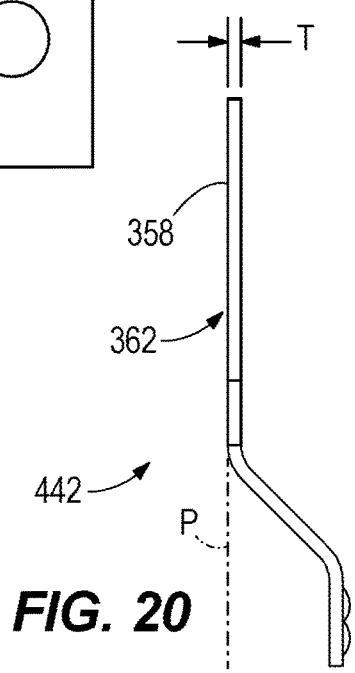
FIG. 20 is a right side view of the accessory anchor portion of FIG. 18.

FIGS. 18-20 illustrate an anchor portion 358 of a portion of an accessory 442, the anchor portion 358 having an anchor interface 360 according to one implementation of the disclosure. The anchor interface 360 may be employed on any accessory attachable to the power tool 10, such as but not limited to the accessories 42 and 421-426 illustrated in FIGS. 2-8 (e.g., in place of the prior art anchor interface 56), other accessories discussed above, and others.

The anchor portion 358 includes a generally planar portion of material 362, such as a metal, a metal alloy, a hi-metal, or any combination of metals, metal alloys, hi-metals, etc. For example, the metal may include hardened steel, carbide, etc. The anchor portion 358 may be formed from other materials, such as a polymer, a composite, etc., in other implementations. The anchor portion 358 has a thickness T (FIG. 20) in a direction perpendicular to a plane P (FIG. 20) of the generally planar portion of material 362. The anchor portion 358 includes an outer edge 364 forming a boundary of generally planar portion of material 362 in the plane P. The anchor portion 358 is stepped in the illustrated implementation, as best illustrated in FIG. 20, but may be entirely generally planar in other implementations (such as the accessory 42 illustrated in FIG. 2), depending on the type of accessory with which the anchor portion 358 is employed.

The anchor interface 360 includes an open aperture 366 open to the outer edge 364. In other words, the open aperture 366 is not enclosed by the anchor portion 358 but is formed having an open end 368 in communication with the environment E surrounding the anchor portion 358 in the plane P. The open aperture 366 also includes a closed end 370 opposite the open end 368. A longitudinal axis L extends from the closed end 370 to the open end 368, generally longitudinally through the open aperture 366, and lies parallel to the plane P of the anchor portion 358. In the illustrated implementation, the longitudinal axis L is a midline of the open aperture 366 and the open aperture 366 is symmetrical about the longitudinal axis L. However, in other implementations the open aperture 366 need not be symmetrical and the longitudinal axis L may extend generally longitudinally through the open aperture 366. The open aperture 366 allows the anchor portion 358 to be attached to the power tool 10 from the side of the oscillation axis B, by movement in a direction transverse to the oscillation axis B between the accessory holder 36 and the clamping flange 50, and then into engagement with the accessory holder 36. The longitudinal axis L may coincide with an overall longitudinal axis (not shown) of the accessory 42, 421-426 with which it is employed in some implementations, but may be disposed at any angle with respect to the overall longitudinal axis (not shown) of the accessory 42, 421-426 with which it is employed in other implementations. The open aperture 366 is a through-hole extending through the thickness T of the generally planar portion of material 362.

The open aperture 366 has a generally Y-shape defined by a trunk portion 372 and a branch portion 374. The trunk portion 372 extends generally longitudinally from the closed end 370 towards the open end 368 and is at least partially defined by a pair of substantially parallel edges 376a, 376b. The trunk portion 372 at the closed end 370 is curved, e.g., generally semi-circular as illustrated, such that the trunk portion 372 has a generally U-shape. However, in other implementations, the trunk portion 372 may have other shapes such as other curves, polygons, or may be generally straight. The branch portion 374 is defined by a pair of diverging edges 378a, 378b disposed between the substantially parallel edges 376a, 376b and the environment E and diverging from each other to the open end 368. The substantially parallel edges 376a, 376b and the diverging edges 378a, 378b are each substantially straight in the illustrated implementation, but may be curved or irregularly shaped in other implementations. The open aperture 366 may also include a pair of notches 375a, 375b disposed between the substantially parallel edges 376a, 376b and the diverging edges 378a, 378b. The pair of notches 375a, 375b may be formed as a mirror image of the fourth and sixth peripheral openings 380d, 380f, respectively, about the lateral axis D. In some implementations, the open aperture 366 does not include the notches 375a, 375b; for example, the open aperture 366 may be wider such that material defining the notches 375a, 375b is removed. The open aperture 366 may have other shapes in other implementations, such as, but not limited to, the other shapes in the other implementations disclosed herein.

The anchor interface 360 also includes a plurality of peripheral openings 380 extending generally radially with respect to a center C, all of which are in communication with the open aperture 366. The center C is disposed in the open aperture 366 and may coincide with the oscillation axis B when the anchor portion 358 is attached to the power tool 10. The plurality of peripheral openings 380 are through-holes extending through the thickness T of the generally planar portion of material 362 at a predetermined radial distance from the center C.

The plurality of peripheral openings 380 are disposed at 30 degree intervals about the center C from 60 degrees to 300 degrees, where the open end 368 is disposed at zero degrees and moving clockwise. The open end 368 being disposed at zero degrees means a zero-degree radial reference line R extends from the center C and intersects the open end 368 anywhere between the edges 376a, 376b. The zero-degree radial reference line R may coincide with the longitudinal axis L, as shown in the illustrated implementation, but need not coincide with the longitudinal axis L in other implementations. For example, in such other implementations, the zero-degree radial reference line R may extend from the center C through the open end 368 closer to one of the edges 376a, 376b of the open aperture 366 than to the other one of the edges 376a, 376b.

Thus, the plurality of peripheral openings 380 includes nine peripheral openings including a first peripheral opening 380a at about 60 degrees, a second peripheral opening 380b at about 90 degrees, a third peripheral opening 380c at about 120 degrees, a fourth peripheral opening 380d at about 150 degrees, a fifth peripheral opening 380e at about 180 degrees, a sixth peripheral opening 380f at about 210 degrees, a seventh peripheral opening 380g at about 240 degrees, an eighth peripheral opening 380h at about 270 degrees, and a ninth peripheral opening 380i at about 300 degrees, each with respect to the zero-degree radial reference line R. In other implementations, the anchor interface 360 may include fewer or more than nine peripheral openings. For example, if the open aperture 366 is made narrower, the anchor interface 360 may include additional peripheral openings 380 at 30 degrees and/or at 330 degrees with respect to the zero-degree radial reference line R. In yet other implementations, the open aperture 366 may be a closed aperture (not shown) that is not open to the outer edge 364 such that further peripheral openings 80 are disposed at zero degrees, 30 degrees, and 330 degrees. In such an implementation, there would be additional material on the anchor interface 360 to create the added peripheral openings as a mirror image of the peripheral openings 380b-380h (e.g., the peripheral openings 380 from 90 degrees to 270 degrees) about a lateral axis D. The lateral axis D is perpendicular to the longitudinal axis L and intersects the center C.

In the illustrated implementation of FIGS. 18-20, the plurality of peripheral openings 380 are each connected to the open aperture 366. Each peripheral opening 380 is defined by a pair of sidewalls 382a, 382b, each sidewall 382a, 382b being substantially straight and disposed substantially parallel with respect to each other. Only the pairs of sidewalls 382a, 382b associated with the second peripheral opening 380b and the fourth peripheral opening 380d are labeled in FIG. 18 to avoid crowded reference numerals in the drawings, but it should be understood that each one of the peripheral openings 380a-380i (and other peripheral openings in other implementations) is defined by a respective pair of sidewalls 382a, 382b. It should also be noted that, in the implementation of FIGS. 18-20, the pair of sidewalls 382a, 382b need not be mirror images of each other. In other words, one of the pair of sidewalls 382a, 382b may be shorter than the other (e.g., see the first, third, fourth, sixth, seventh, and ninth peripheral openings 380a, 380c, 380d, 380f, 380g, 380i). Regardless of size, the pair of sidewalls 382a, 382b provides material on both circumferential sides (with respect to a circumference about the center C) of each of the peripheral openings 380 for a driving engagement between the locating features 46 projecting from the accessory holder 36 and the anchor portion 358 during oscillation of the accessory holder 36 in two rotational directions (e.g., clockwise and counterclockwise about the center C). In some implementations, the pair of sidewalls 382a, 382b may be curved or may have other shapes. In some implementations, the pair of sidewalls 382a, 382b may be non-parallel. The sidewalls 382a, 382b are connected to each other at a radially distal end thereof by a rounded end wall 384 (also only labeled on the second and fourth peripheral openings 380b, 380d for clarity of the drawings). In some implementations, the end wall 384 may be substantially straight, may have a point or apex, or may have a curve or curves of any shape.

The first, second, and third peripheral openings 380a-380c form a first conjoined grouping 395 of peripheral openings 380. As illustrated, the peripheral openings 380a-380c of the first conjoined grouping 395 are in communication with each other outside of the open aperture 366, the first conjoined grouping 395 in turn being in communication with the open aperture 366. The fourth, fifth, and sixth peripheral openings 380d-380f form a second conjoined grouping 396 also in communication with each other and with the open aperture 366, independently of the first conjoined grouping 395. Furthermore, the seventh, eighth, and ninth peripheral openings 380g-380i form a third conjoined grouping 397 also in communication with each other and with the open aperture 366, independently of the first and second conjoined groupings 395, 396. Each conjoined grouping 395, 396, 397 has the same structure. As such, the first conjoined grouping 395 of peripheral openings 380a-380c will be described below, and the second and the third conjoined groupings 396, 397 of peripheral openings 380d-380f, 380g-380i, respectively, need not be described herein. However, in other implementations each conjoined grouping may have different structures from each other. It should be understood that the structure of the second and third conjoined groupings 396, 397 of peripheral openings 380d-380f, 380g-380i is the same as the first conjoined grouping 395 of peripheral openings 380a-380c, though the second conjoined grouping 396 of peripheral openings 380d-380f is disposed about 90 degrees from the first conjoined grouping 395 of peripheral openings 380a-380c about the center C, and the third conjoined grouping 397 of peripheral openings 380g-380i is disposed about 180 degrees from the first conjoined grouping 395 of peripheral openings 380a-380c about the center C. In other implementations, the first grouping 395 may include any three of the peripheral openings 380, such as any three immediately adjacent peripheral openings 380, or any three peripheral openings 380 (whether immediately adjacent and/or not immediately adjacent, in any combination). In yet other implementations, the first grouping 395 may include any two, four, or more of the peripheral openings 380 (whether immediately adjacent and/or not immediately adjacent, in any combination).

A first connecting aperture 398a is disposed between the first peripheral opening 380a and the second peripheral opening 380b to provide communication between the first peripheral opening 380a and the second peripheral opening 380b. The first connecting aperture 398a is disposed radially outside the central aperture. A second connecting aperture 398b is disposed between the second peripheral opening 380b and the third peripheral opening 380c to provide communication between the second peripheral opening 380b and the third peripheral opening 380c. In the illustrated implementation, the first and second connecting apertures 398a, 398b are mirror images of each other; however, in other implementations, the first and second connecting apertures 398a, 398b need not be symmetrical. The first and second connecting apertures 398a, 398b each have a generally trapezoidal shape defined by respective pairs of non-parallel sidewalls 399a-b, 399c-d diverging away from the second peripheral opening 380b in generally opposite directions. However, in other implementations, the pairs of sidewalls 399a-b, 399c-d may be parallel, curved, or have any other suitable shape that connects the first grouping 395 outside of the open aperture 366.

A shared neck opening 392 is disposed between the open aperture 366 and the first conjoined grouping 395 and provides communication between the first conjoined grouping 395 of peripheral openings 380a-380c and the open aperture 366. More specifically, the shared neck opening 392 is about the same width as the pair of sidewalls 382a, 382b and is substantially aligned with the second peripheral opening 380b, e.g., in a radial direction with respect to the center C. Thus, the shared neck opening 392 is disposed at about 90 degrees. In other implementations, the shared neck opening 392 may be disposed between the open aperture 366 and any one of the peripheral openings 380a-380c, either aligned with the one of the peripheral openings 380a-380c or offset between the peripheral openings 380a-380c, e.g., anywhere between about 60 and about 120 degrees. In other implementations, the shared neck opening 392 may have other widths, shapes, orientations, and combinations of widths and shapes and orientations from one shared neck opening 392 to another (as it should be understood that each of the first, second, and third conjoined groupings 395, 396, 397 includes a shared neck opening 392).

Figure 21:
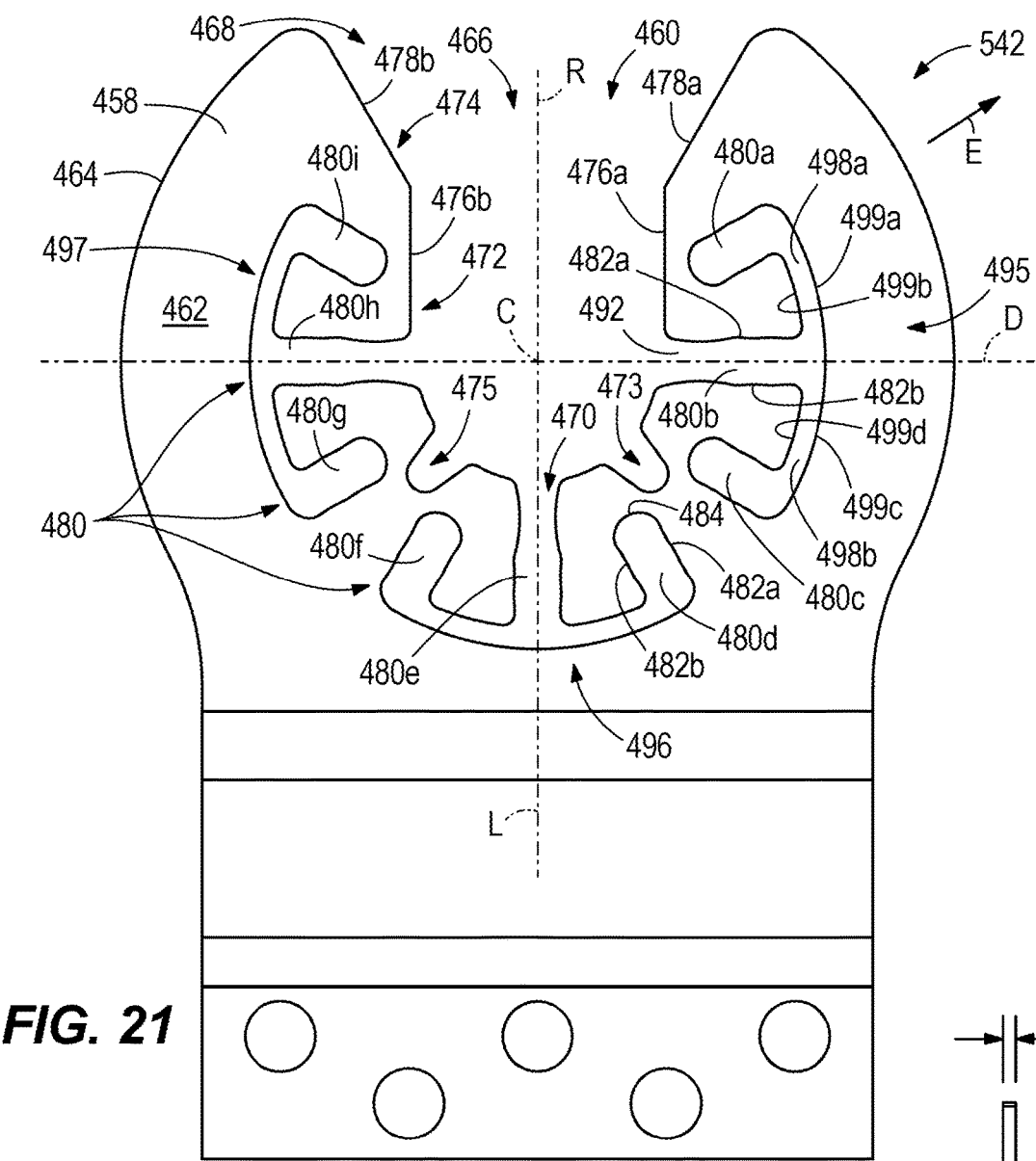
FIG. 21 is a top view of an accessory anchor portion attachable to the oscillating power tool of FIG. 1 according to one implementation of the disclosure.
Figure 22:
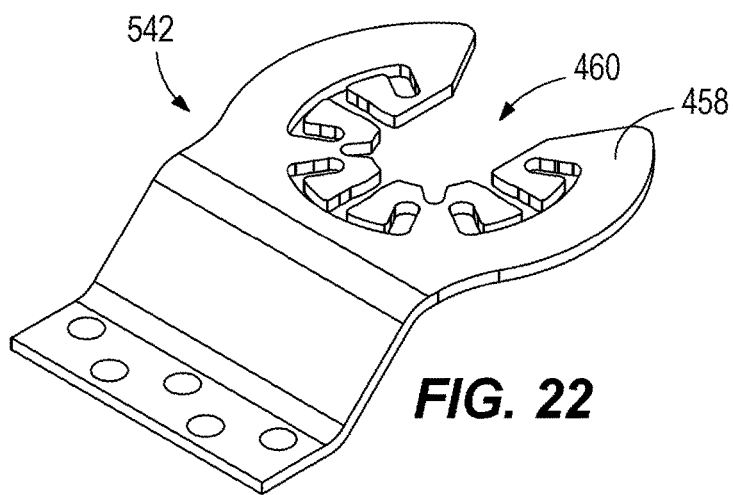
FIG. 22 is a top perspective view of the accessory anchor portion of FIG. 21.
Figure 23:
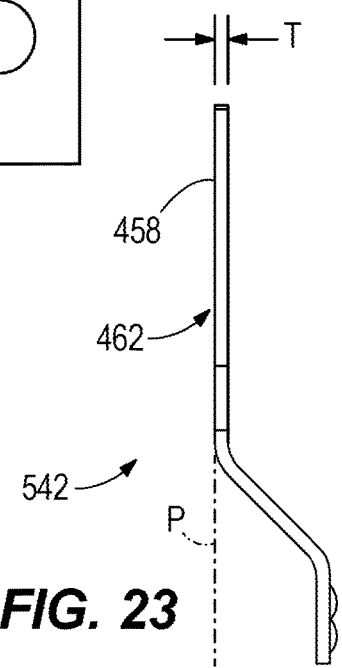
FIG. 23 is a right side view of the accessory anchor portion of FIG. 21.

FIGS. 21-23 illustrate an anchor portion 458 of an accessory 542, the anchor portion 458 having an anchor interface 460 according to one implementation of the disclosure. The anchor interface 460 may be employed on any accessory attachable to the power tool 10, such as but not limited to the accessories 42 and 421-426 illustrated in FIGS. 2-8 (e.g., in place of the prior art anchor interface 56), other accessories discussed above, and others.

The anchor portion 458 includes a generally planar portion of material 462, such as a metal, a metal alloy, a bi-metal, or any combination of metals, metal alloys, bi-metals, etc. For example, the metal may include hardened steel, carbide, etc. The anchor portion 458 may be formed from other materials, such as a polymer, a composite, etc., in other implementations. The anchor portion 458 has a thickness T (FIG. 23) in a direction perpendicular to a plane P (FIG. 23) of the generally planar portion of material 462. The anchor portion 458 includes an outer edge 464 forming a boundary of the generally planar portion of material 462 in the plane P. The anchor portion 458 is stepped in the illustrated implementation, as best illustrated in FIG. 23, but may be entirely generally planar in other implementations (such as the accessory 42 illustrated in FIG. 2), depending on the type of accessory with which the anchor portion 458 is employed.

The anchor interface 460 includes an open aperture 466 open to the outer edge 464. In other words, the open aperture 466 is not enclosed by the anchor portion 458 but is formed having an open end 468 in communication with the environment E surrounding the anchor portion 458 in the plane P. The open aperture 466 also includes a closed end 470 opposite the open end 468. A longitudinal axis L extends from the closed end 470 to the open end 468, generally longitudinally through the open aperture 466, and lies parallel to the plane P of the anchor portion 458. In the illustrated implementation, the longitudinal axis L is a midline of the open aperture 466 and the open aperture 466 is symmetrical about the longitudinal axis L. However, in other implementations the open aperture 466 need not be symmetrical and the longitudinal axis L may extend generally longitudinally through the open aperture 466. The open aperture 466 allows the anchor portion 458 to be attached to the power tool 10 from the side of the oscillation axis B, by movement in a direction transverse to the oscillation axis B between the accessory holder 36 and the clamping flange 50, and then into engagement with the accessory holder 36. The longitudinal axis L may coincide with an overall longitudinal axis (not shown) of the accessory 542 with which it is employed in some implementations, but may be disposed at any angle with respect to the overall longitudinal axis (not shown) of the accessory 542 with which it is employed in other implementations. The open aperture 466 is a through-hole extending through the thickness T of the generally planar portion of material 462.

The open aperture 466 has a generally Y-shape defined by a trunk portion 472 and a branch portion 474. The trunk portion 472 extends generally longitudinally from the closed end 470 towards the open end 468 and is at least partially defined by a pair of substantially parallel edges 476a, 476b. The trunk portion 472 at the closed end 470 is curved, e.g., generally semi-circular as illustrated, such that the trunk portion 472 has a generally U-shape. However, in other implementations, the trunk portion 472 may have other shapes such as other curves, polygons, or may be generally straight. The branch portion 474 is defined by a pair of diverging edges 478a, 478b disposed between the substantially parallel edges 476a, 476b and the environment E and diverging from each other to the open end 468. The substantially parallel edges 476a, 476b and the diverging edges 478a, 478b are each substantially straight in the illustrated implementation, but may be curved or irregularly shaped in other implementations. The open aperture 466 may have other shapes in other implementations, such as, but not limited to, the other shapes in the other implementations disclosed herein. A first radial arm 473 extends radially away from the open aperture 466 at about 135 degrees, and a second radial arm 475 extends radially away from the open aperture 466 at about 225 degrees. The first and second radial arms 473, 475 extend to a maximum radial distance from the center C that is approximately equal to a starting radial distance of the peripheral openings 480. In other implementations, the first and second radial arms 473, 475 may have other locations and configurations.

The anchor interface 460 also includes a plurality of peripheral openings 480 extending generally radially with respect to a center C, all of which are in communication with the open aperture 466. The center C is disposed in the open aperture 466 and may coincide with the oscillation axis B when the anchor portion 458 is attached to the power tool 10. The plurality of peripheral openings 480 are through-holes extending through the thickness T of the generally planar portion of material 462 at a predetermined radial distance from the center C.

The plurality of peripheral openings 480 are disposed at 30 degree intervals about the center C from 60 degrees to 300 degrees, where the open end 468 is disposed at zero degrees and moving clockwise. The open end 468 being disposed at zero degrees means a zero-degree radial reference line R extends from the center C and intersects the open end 468 anywhere between the edges 476a, 476b. The zero-degree radial reference line R may coincide with the longitudinal axis L, as shown in the illustrated implementation, but need not coincide with the longitudinal axis L in other implementations. For example, in such other implementations, the zero-degree radial reference line R may extend from the center C through the open end 468 closer to one of the edges 476a, 476b of the open aperture 466 than to the other one of the edges 476a, 476b.

Thus, the plurality of peripheral openings 480 includes nine peripheral openings including a first peripheral opening 480a at about 60 degrees, a second peripheral opening 480b at about 90 degrees, a third peripheral opening 480c at about 120 degrees, a fourth peripheral opening 480d at about 150 degrees, a fifth peripheral opening 480e at about 180 degrees, a sixth peripheral opening 480f at about 210 degrees, a seventh peripheral opening 480g at about 240 degrees, an eighth peripheral opening 480h at about 270 degrees, and a ninth peripheral opening 480i at about 300 degrees, each with respect to the zero-degree radial reference line R. In other implementations, the anchor interface 460 may include fewer or more than nine peripheral openings. For example, if the open aperture 466 is made narrower, the anchor interface 460 may include additional peripheral openings 480 at 30 degrees and/or at 330 degrees with respect to the zero-degree radial reference line R. In yet other implementations, the open aperture 466 may be a closed aperture (not shown) that is not open to the outer edge 464 such that further peripheral openings 480 are disposed at zero degrees, 30 degrees, and 330 degrees. In such an implementation, there would be additional material on the anchor interface 460 to create the added peripheral openings as a mirror image of the peripheral openings 480*b*-480*h* (e.g., the peripheral openings 480 from 90 degrees to 270 degrees) about a lateral axis D. The lateral axis D is perpendicular to the longitudinal axis L and intersects the center C.

In the illustrated implementation of FIGS. 21-23, the plurality of peripheral openings 480 are each connected to the open aperture 466. Each peripheral opening 480 is defined by a pair of sidewalls 482*a*, 482*b*, each sidewall 482*a*, 482*b* being substantially straight and disposed substantially parallel with respect to each other. Only the pairs of sidewalls 482*a*, 482*b* associated with the second peripheral opening 480*b* and the fourth peripheral opening 480*d* are labeled in FIG. 21 to avoid crowded reference numerals in the drawings, but it should be understood that each one of the peripheral openings 480*a*-480*i* (and other peripheral openings in other implementations) is defined by a respective pair of sidewalls 482*a*, 482*b*. It should also be noted that, in the implementation of FIGS. 21-23, the pair of sidewalls 482*a*, 482*b* need not be mirror images of each other. In other words, one of the pair of sidewalls 482*a*, 482*b* may be shorter than the other (e.g., see the first, third, fourth, sixth, seventh, and ninth peripheral openings 480*a*, 480*c*, 480*d*, 480*f*, 480*g*, 480*i*). Regardless of size, the pair of sidewalls 482*a*, 482*b* provides material on both circumferential sides (with respect to a circumference about the center C) of each of the peripheral openings 480 for a driving engagement between the locating features 46 (FIG. 2) projecting from the accessory holder 36 and the anchor portion 458 during oscillation of the accessory holder 36 in two rotational directions (e.g., clockwise and counterclockwise about the center C). In some implementations, the pair of sidewalls 482*a*, 482*b* may be curved or may have other shapes. In some implementations, the pair of sidewalls 482*a*, 482*b* may be non-parallel.

With respect to the first, third, fourth, sixth, seventh, and ninth peripheral openings 480*a*, 480*c*, 480*d*, 480*f*, 480*g*, 480*i*, the sidewalls 482*a*, 482*b* are connected to each other at a radially inner distal end thereof by a rounded end wall 484 (only labeled on the fourth peripheral openings 480*d* for clarity of the drawings). In some implementations, the end wall 384 may be substantially straight, may have a point or apex, or may have a curve or curves of any shape.

With respect to the second, fifth, and eighth peripheral openings 480*b*, 480*e*, 480*h*, a radially outer distal end thereof forms a connecting portion, which will be described in greater detail below.

The first, second, and third peripheral openings 480*a*-480*c* form a first conjoined grouping 495 of peripheral openings 480 in communication with each other outside of the open aperture 466, the first conjoined grouping 495 in turn being in communication with the open aperture 466. The fourth, fifth, and sixth peripheral openings 480*d*-480*f* form a second conjoined grouping 496 also in communication with each other and with the open aperture 466, independently of the first conjoined grouping 495. Furthermore, the seventh, eighth, and ninth peripheral openings 480*g*-480*i* form a third conjoined grouping 497 also in communication with each other and with the open aperture 466, independently of the first and second conjoined groupings 495, 496. Each conjoined grouping 495, 496, 497 has the same structure. As such, the first conjoined grouping 495 of peripheral openings 480*a*-480*c* will be described below, and the second and the third conjoined groupings 496, 497 of peripheral openings 480*d*-480*f*, 480*g*-480*i*, respectively, need not be described herein. It should be understood that the structure of the second and third conjoined groupings 496, 497 of peripheral openings 480*d*-480*f*, 480*g*-480*i* is the same as the first conjoined grouping 495 of peripheral openings 480*a*-480*c*, though the second conjoined grouping 496 of peripheral openings 480*d*-480*f* is disposed about 90 degrees from the first conjoined grouping 495 of peripheral openings 480*a*-480*f* about the center C, and the third conjoined grouping 497 of peripheral openings 480*g*-480*i* is disposed about 180 degrees from the first conjoined grouping 495 of peripheral openings 480*a*-480*c* about the center C. In other implementations, the first conjoined grouping 495 may include any three of the peripheral openings 480, such as any three immediately adjacent peripheral openings 480, or any three peripheral openings 480 (whether immediately adjacent and/or not immediately adjacent, in any combination). In yet other implementations, the first conjoined grouping 495 may include any two, four, or more of the peripheral openings 480 (whether immediately adjacent and/or not immediately adjacent, in any combination).

A first connecting aperture 498*a* is disposed between the first peripheral opening 480*a* and the second peripheral opening 480*b* to provide communication between the first peripheral opening 480*a* and the second peripheral opening 480*b*. A second connecting aperture 498*b* is disposed between the second peripheral opening 480*b* and the third peripheral opening 480*c* to provide communication between the second peripheral opening 480*b* and the third peripheral opening 480*c*. In the illustrated implementation, the first and second connecting apertures 498*a*, 498*b* are mirror images of each other; however, in other implementations, the first and second connecting apertures 498*a*, 498*b* need not be symmetrical. The first and second connecting apertures 498*a*, 498*b* each have a generally arcuate shape defined by respective pairs of sidewalls 499*a-b*, 499*c-d* extending away from the second peripheral opening 480*b* in generally opposite circumferential directions. However, in other implementations, the pairs of sidewalls 499*a-b*, 499*c-d* may be straight, curved in a different way, angled differently, or have any other suitable shape that connects the first conjoined grouping 495 outside of the open aperture 466.

A shared neck opening 492 is disposed between the open aperture 466 and the first conjoined grouping 495 and provides communication between the first conjoined grouping 495 of peripheral openings 480*a*-480*c* and the open aperture 466. More specifically, the shared neck opening 492 is about the same width as the pair of sidewalls 482*a*, 482*b* and is substantially aligned with the second peripheral opening 480*b*, e.g., in a radial direction with respect to the center C. Thus, the shared neck opening 492 is disposed at about 90 degrees. In other implementations, the shared neck opening 492 may be disposed between the open aperture 466 and any one of the peripheral openings 480*a*-480*c*, either aligned with the one of the peripheral openings 480*a*-480*c* or offset between the peripheral openings 480*a*-480*c*, e.g., anywhere between about 60 and about 120 degrees. In other implementations, the shared neck opening 492 may have other widths, shapes, orientations, and combinations of widths and shapes and orientations from one shared neck opening 492 to another (as it should be understood that each of the first, second, and third conjoined groupings 495, 496, 497 includes a shared neck opening 492).

In operation, an operator attaches the accessory 142, 242, 342, 442, 542 to the accessory holder 36 of the power tool 10 such that the locating features 46 projecting from the accessory holder 36 extend into the anchor interface 60, 160, 260, 360, 460 in a driving engagement with the anchor portion 58, 158, 258, 358, 458. The center C coincides with the oscillation axis B.

A kit may include the power tool 10 and any one or more of the accessories 142, 242, 342, 442, 542. Another kit may include any combination of two or more of the accessories 142, 242, 342, 442, 542.

Thus, the disclosure provides, among other things, an anchor interface on an accessory for attaching the accessory in a driving engagement with an oscillating power tool. Although the disclosure has been described in detail with reference to certain preferred implementations, variations and modifications exist within the scope and spirit of one or more independent aspects of the disclosure as described.

What is claimed is:

1. An anchor for selectively coupling with an oscillating power tool, the anchor comprising:
   a generally planar portion having an anchor interface configured to couple to the oscillating power tool and defining a longitudinal axis and a center point, the anchor interface comprising:
      a central aperture including the center point therein; and
      a plurality of peripheral openings disposed radially about the center point and in communication with the central aperture;
      wherein the plurality of peripheral openings includes at least one conjoined group of peripheral openings collectively in communication with the central aperture by way of a single shared neck opening, the at least one conjoined group including a first peripheral opening, a second peripheral opening, and a third peripheral opening,
      wherein the at least one conjoined group of peripheral openings includes a first connecting aperture disposed between the first peripheral opening and the second peripheral opening and a second connecting aperture disposed between the second peripheral opening and the third peripheral opening, and
      wherein the first and second connecting apertures are disposed between radially outermost ends of the respective first, second, and third peripheral openings.

2. The anchor of claim 1, wherein the at least one conjoined group includes a first conjoined group, a second conjoined group, and a third conjoined group.

3. The anchor of claim 1, wherein the shared neck opening is disposed radially between the at least one conjoined group of peripheral openings and the central aperture.

4. The anchor of claim 1, wherein the shared neck opening is radially aligned with the second peripheral opening, and wherein the second peripheral opening is disposed between the first and third peripheral openings.

5. The anchor of claim 1, wherein the central aperture includes an open end and a closed end opposite the open end, wherein a zero-degree radial reference line coincides with the longitudinal axis and extends through the open end, and wherein the plurality of peripheral openings are disposed at 30 degree intervals about the center point from 60 degrees to 300 degrees with respect to the zero-degree radial reference line.

6. An anchor for selectively coupling with an oscillating power tool, the anchor comprising:
   a generally planar portion having an anchor interface configured to couple to the oscillating power tool and defining a longitudinal axis and a center point, the anchor interface comprising:
      a central aperture in which the center point is disposed; and
      a plurality of peripheral openings disposed radially about the center point;
      wherein the plurality of peripheral openings includes at least one conjoined group of peripheral openings including at least a first and a second of the plurality of peripheral openings in communication with each other by way of a connecting aperture,
      wherein the connecting aperture has a generally trapezoidal shape defined by a pair of non-parallel sidewalls each extending from the first of the plurality of peripheral openings to the second of the plurality of peripheral openings.

7. The anchor of claim 6, wherein the at least one conjoined group of peripheral openings includes a third of the plurality of peripheral openings, and wherein the connecting aperture is a first connecting aperture, the anchor further comprising:
   a second connecting aperture disposed between the second of the plurality of peripheral openings and the third of the plurality of peripheral openings.

8. The anchor of claim 7, wherein the pair of non-parallel sidewalls is a first pair of non-parallel sidewalls, and wherein the second connecting aperture has a generally trapezoidal shape defined by a second pair of non-parallel sidewalls each extending from the second of the plurality of peripheral openings to the third of the plurality of peripheral openings.

9. The anchor of claim 6, wherein the central aperture includes an open end and a closed end opposite the open end.

10. The anchor of claim 6, wherein the connecting aperture is disposed radially outside the central aperture.

11. The anchor of claim 6, wherein the at least one conjoined group of peripheral openings is in communication with the central aperture by way of a single shared neck opening disposed radially between the at least one conjoined group of peripheral openings and the central aperture.

12. An anchor for selectively coupling with an oscillating power tool, the anchor comprising:
   a generally planar portion having an anchor interface configured to couple to the oscillating power tool and defining a longitudinal axis and a center point, the anchor interface comprising:
      a central aperture in which the center point is disposed; and
      a plurality of peripheral openings disposed radially about the center point;
      wherein the plurality of peripheral openings includes at least one conjoined group of peripheral openings including at least two of the plurality of peripheral openings connected to each other by a connecting aperture, and
      wherein the connecting aperture is disposed at a radially outermost end of the at least two of the plurality of peripheral openings.

13. The anchor of claim 12, wherein the at least two of the plurality of peripheral openings includes a first peripheral opening, a second peripheral opening, and a third peripheral opening, and wherein the connecting aperture is a first connecting aperture disposed between the first peripheral opening and the second peripheral opening, the anchor further comprising:

a second connecting aperture disposed between the second peripheral opening and the third peripheral opening, wherein the second connecting aperture is disposed at a radially outermost end of the second and third peripheral openings.

14. The anchor of claim 13, wherein the first and second connecting apertures have an arcuate shape.

15. The anchor of claim 12, wherein the connecting aperture has an arcuate shape.

16. The anchor of claim 12, wherein the central aperture includes an open end and a closed end opposite the open end.

17. The anchor of claim 12, wherein the connecting aperture is disposed radially outside the central aperture.

18. The anchor of claim 12, wherein the at least one conjoined group of peripheral openings is in communication with the central aperture by way of a single shared neck opening disposed radially between the at least one conjoined group of peripheral openings and the central aperture.

19. An anchor for selectively coupling with an oscillating power tool, the anchor comprising:
- a generally planar portion having an anchor interface configured to couple to the oscillating power tool and defining a longitudinal axis and a center point, the anchor interface comprising:
  - a central aperture including the center point therein; and
  - a plurality of peripheral openings disposed radially about the center point and in communication with the central aperture;
- wherein the plurality of peripheral openings includes at least one conjoined group of peripheral openings collectively in communication with the central aperture by way of a single shared neck opening, the at least one conjoined group including a first peripheral opening, a second peripheral opening, and a third peripheral opening,
- wherein the at least one conjoined group of peripheral openings includes a first connecting aperture disposed between the first peripheral opening and the second peripheral opening and a second connecting aperture disposed between the second peripheral opening and the third peripheral opening, and
- wherein the first and second connecting apertures each have a generally trapezoidal shape defined by respective pairs of non-parallel sidewalls.

20. The anchor of claim 19, wherein the central aperture includes an open end and a closed end opposite the open end, wherein a zero-degree radial reference line coincides with the longitudinal axis and extends through the open end, and wherein the plurality of peripheral openings are disposed at 30 degree intervals about the center point from 60 degrees to 300 degrees with respect to the zero-degree radial reference line.

* * * * *